(12) United States Patent
Simard

(10) Patent No.: US 10,685,285 B2
(45) Date of Patent: Jun. 16, 2020

(54) MIRROR DEEP NEURAL NETWORKS THAT REGULARIZE TO LINEAR NETWORKS

(71) Applicant: Microsoft Technology Licensing, LLC, Redmond, WA (US)

(72) Inventor: Patrice Simard, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 770 days.

(21) Appl. No.: 15/359,924

(22) Filed: Nov. 23, 2016

(65) Prior Publication Data

US 2018/0144242 A1   May 24, 2018

(51) Int. Cl.
  *G06N 3/08*  (2006.01)
  *G06N 3/04*  (2006.01)
  *G06N 20/00* (2019.01)

(52) U.S. Cl.
  CPC .......... *G06N 3/084* (2013.01); *G06N 3/0454* (2013.01); *G06N 20/00* (2019.01)

(58) Field of Classification Search
  CPC ........ G06N 3/084; G06N 3/0454; G06N 3/08; G06N 3/04; G06N 20/00
  USPC .......................................................... 706/20
  See application file for complete search history.

(56) References Cited

U.S. PATENT DOCUMENTS

| | | | | |
|---|---|---|---|---|
| 5,943,660 | A * | 8/1999 | Yesildirek | G06N 3/0454 706/10 |
| 7,788,196 | B2 * | 8/2010 | Buscema | G06N 3/0481 706/25 |
| 9,373,324 | B2 * | 6/2016 | Sainath | G10L 15/07 |
| 9,646,243 | B1 * | 5/2017 | Gokmen | G06N 3/0635 |
| 9,818,059 | B1 * | 11/2017 | Woo | G06F 13/1668 |
| 10,268,232 | B2 * | 4/2019 | Harris | G02F 3/024 |
| 2002/0168100 | A1 * | 11/2002 | Woodall | G06K 9/66 382/156 |

(Continued)

FOREIGN PATENT DOCUMENTS

CN    105105743 A    12/2015

OTHER PUBLICATIONS

He et al., Deep Residual Learning for Image Recognition, Jun. 27-30, 2016, IEEE Conference on Computer Vision and Pattern Recognition (CVPR), pp. 770-778. (Year: 2016).*

(Continued)

*Primary Examiner* — Miranda M Huang
*Assistant Examiner* — Chase P. Hinckley
(74) *Attorney, Agent, or Firm* — Alleman Hall Creasman & Tuttle LLP

(57) ABSTRACT

The mirror deep neural networks (DNNs) as described herein recognize patterns in an input signal. Mirror DNNs regularize to a linear function and train very quickly. Mirror DNNs employ a neural network pattern recognizer that receives a set of features extracted from an input signal and inputs the set of features into a multi-layer neural network. The multi-layer neural network has an input layer that receives the set of features, a plurality of intermediate layers, and an output layer that generates a set of output values that are indicative of a recognized pattern exhibited in the input signal. A first and second non-linear equation pair are chosen and applied to intermediate layers of the neural network so as to make the output values that are indicative of a pattern exhibited in the input signal linear.

20 Claims, 18 Drawing Sheets

SINGLE LAYER OF A MIRROR DNN

(56) References Cited

U.S. PATENT DOCUMENTS

| | | | | |
|---|---|---|---|---|
| 2004/0162796 | A1* | 8/2004 | Nugent | B82Y 10/00 |
| | | | | 706/27 |
| 2012/0254086 | A1* | 10/2012 | Deng | G06N 3/0454 |
| | | | | 706/25 |
| 2015/0036920 | A1* | 2/2015 | Wu | G06N 3/0454 |
| | | | | 382/156 |
| 2015/0161987 | A1* | 6/2015 | Horesh | G10L 15/063 |
| | | | | 704/232 |
| 2016/0092766 | A1* | 3/2016 | Sainath | G10L 25/30 |
| | | | | 706/20 |
| 2016/0098633 | A1 | 4/2016 | Min | |
| 2016/0162781 | A1* | 6/2016 | Lillicrap | G06N 3/0454 |
| | | | | 706/25 |
| 2016/0217369 | A1* | 7/2016 | Annapureddy | G06N 3/082 |
| 2016/0321540 | A1* | 11/2016 | Towal | G06N 3/04 |
| 2016/0335536 | A1* | 11/2016 | Yamazaki | G06N 3/0454 |
| 2017/0103304 | A1* | 4/2017 | Henry | G06N 3/063 |
| 2017/0103316 | A1* | 4/2017 | Ross | G06N 3/08 |
| 2017/0103321 | A1* | 4/2017 | Henry | G06F 9/3867 |
| 2018/0204120 | A1* | 7/2018 | Rei | G06N 3/0445 |

OTHER PUBLICATIONS

Surampudi et al., Speech Signal Processing Using Neural Networks, Jun. 12-13, 2015 IEEE International Advance Computing Conference (IACC), pp. 660-665. (Year: 2015).*

Andreas et al., Controlling the hidden layers' output to optimizing the training process in the Deep Neural Network algorithm, Jun. 8-12, 2015, IEEE International Conference on Cyber Technology in Automation, Control, and Intelligent Systems (CYBER), pp. 1028-1032. (Year: 2015).*

Ghahremani et al., Linearly Augmented Deep Neural Network, Mar. 20-25, 2016, IEEE International Conference on Acoustics, Speech, and Signal Processing (ICASSP), pp. 5085-5089. (Year: 2016).*

Al-Barazanchi et al., Novel CNN Architecture with Residual Learning and Deep Supervision for Large-Scale Scene Image Categorization, Oct. 20-22, 2016 IEEE 7th Annual Ubiquitous Computing, Electronics & Mobile Communication Conference. (Year: 2016).*

Maclaurin et al., Gradient-based Hyperparameter Optimization through Reversible Learning, 2015, Proceedings of the 32nd International Conference on Machine Learning. (Year: 2015).*

Reinhart et al., "Regularization and Stability in Reservoir networks with Output Feedback" Mar. 20, 2012, Neurocomputing, No. 90, pp . 96-105. (Year: 2012).*

DiMattina, Christopher, "Neural Network Analysis of Sensory Processing and Active Data Collection" Jul. 2009, Doctoral Dissertation, Johns Hopkins University, pp. i-341. (Year: 2009).*

Clevert, et al., "Fast and Accurate Deep Network Learning by Exponential Linear Units (Elus)", In Proceedings of the Computing Research Repository, Nov. 2015, pp. 1-14.

Dahl, et al., "Improving Deep Neural Networks for Lvcsr Using Rectified Linear Units and Dropout", In Proceedings of IEEE International Conference on Acoustics, Speech and Signal Processing, May 26, 2013, pp. 8609-8613.

Ghahremani, et al., "Linearly Augmented Deep Neural Network", In Proceedings of IEEE International Conference on Acoustics, Speech and Signal Processing, Mar. 20, 2016, 5 pages.

Glorot, et al., "Deep Sparse Rectifier Neural Networks", In Proceedings of the 14th International Conference on Artificial Intelligence and Statistics, vol. 15, Apr. 11, 2011, pp. 315-323.

He, et al., "Deep Residual Learning for Image Recognition", In Proceedings of the Computing Research Repository, Dec. 2015, pp. 1-12.

Hinton, et al., "Reducing the Dimensionality of Data with Neural Networks", In Journal of Science, vol. 313, Jul. 28, 2016, pp. 504-507.

Ioffe, et al., "Batch Normalization: Accelerating Deep Network Training by Reducing Internal Covariate Shift", In Proceedings of the 32nd International Conference on Machine Learning, Jul. 6, 2015, pp. 1-11.

Krizhevsky, et al., "ImageNet Classification with Deep Convolutional Neural Networks", In Proceedings of 26th Annual Conference on Neural Information Processing Systems, Dec. 3, 2012, pp. 1-9.

Maas, et al., "Rectifier Nonlinearities Improve Neural Network Acoustic Models", In Proceedings of the 30th International Conference on Machine Learning, vol. 28, Jun. 16, 2013, 6 pages.

Ochiai, et al., "Speaker Adaptive Training for Deep Neural Networks Embedding Linear Transformation Networks", In Proceedings of IEEE International Conference on Acoustics, Speech and Signal Processing, Apr. 19, 2015, pp. 4605-4609.

Srivastava, et al., "Dropout: A Simple Way to Prevent Neural Networks from Overfitting", In Journal of Machine Learning Research, vol. 15, Jun. 2014, pp. 1929-1958.

Zeiler, et al., "On Rectified Linear Units for Speech Processing", In Proceedings of IEEE International Conference on Acoustics, Speech and Signal Processing, May 26, 2013, 5 pages.

Zhang, et al., "DNN Speaker Adaptation Using Parameterised Sigmoid and Relu Hidden Activation Functions", In Proceedings of IEEE International Conference on Acoustics, Speech and Signal Processing, Mar. 20, 2016, 5 pages.

Deepthi, et al., "A Mirroring Theorem and its Application to a New Method of Unsupervised Hierarchical Pattern Classification", In International Journal of Computer Science and Information Security, vol. 6, Issue 1, Oct. 2009, pp. 16-25.

Deepthi, et al., "Dimensionality Reduction and Reconstruction using Mirroring Neural Networks and Object Recognition based on Reduced Dimension Characteristic Vector", In Repository of arXiv, arXiv:0712.0932, Dec. 6, 2007, 5 Pages.

* cited by examiner

SINGLE LAYER OF A MIRROR DNN

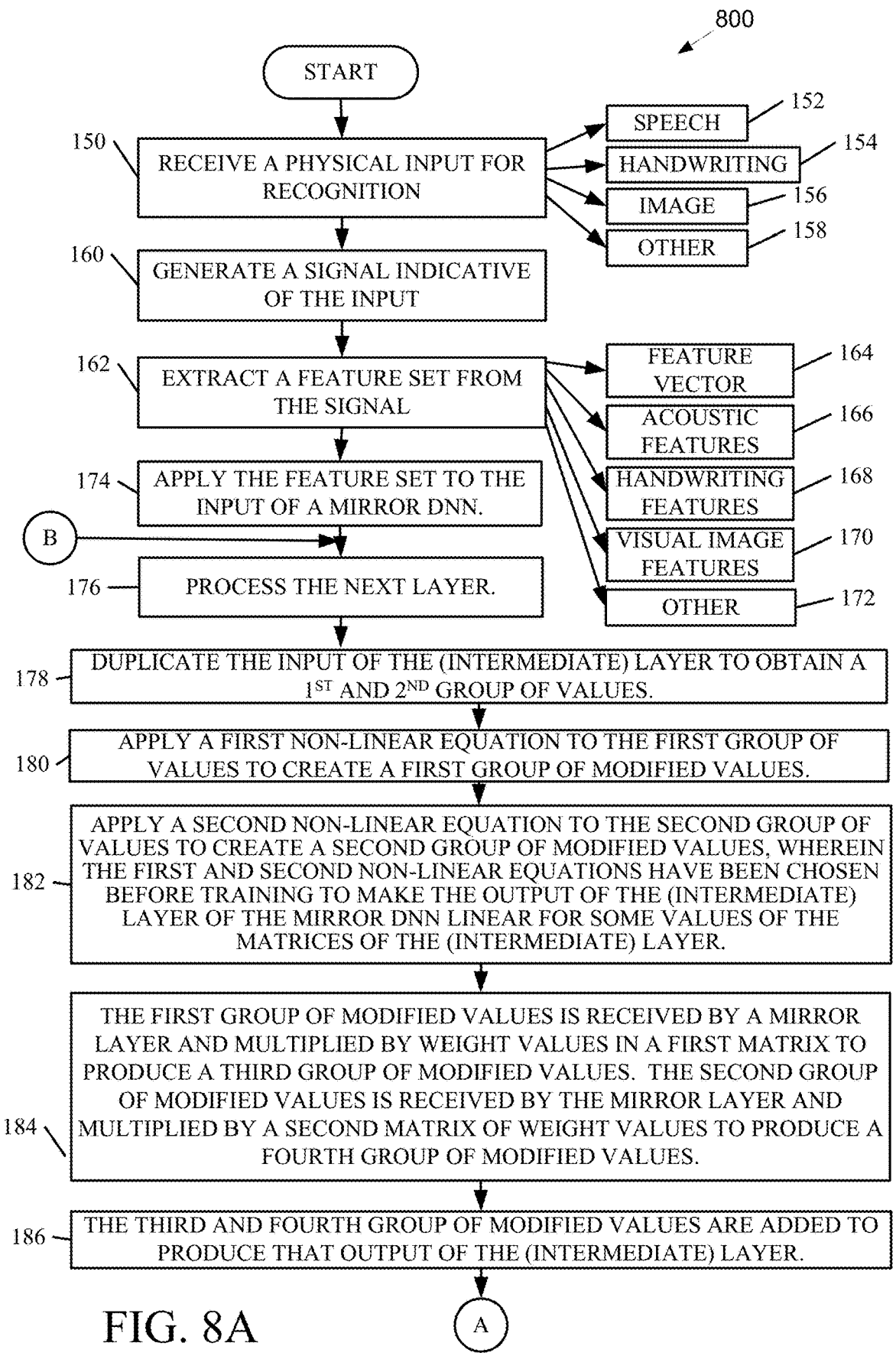

MIRROR DEEP NEURAL NETWORKS THAT REGULARIZE TO LINEAR NETWORKS

BACKGROUND

Computer systems are currently in wide use. Some such computer systems receive input signals indicative of various patterns, and generate a pattern recognition result indicative of one or more patterns recognized in the input. By way of example, some computer systems include speech processing systems, such as speech recognition systems, that receive an audio signal and recognize speech in the audio signal. The speech can be transcribed, for instance, into text. Other computer systems include handwriting recognition systems that receive an input signal indicative of a handwriting character. For instance, the input signal may indicate pixels of a touch sensitive screen that were activated based on a user's touch input on the touch sensitive screen. The input is subjected to handwriting recognition where a character is recognized based on the input. Other computing systems can include, for instance, image recognition systems (such as facial recognition systems, finger print recognition systems, etc.).

Some computing systems that are used in pattern recognition can deploy neural networks (or artificial neural networks). Such networks have an interconnected set of nodes (or neurons) that exchange messages with each other. The connections have numeric weights which indicate the strength of connection between nodes. The weights can be tuned and therefore the neural networks are capable of learning.

During recognition, a set of features (such as a feature vector) is extracted from an input signal representing an input. The features are applied to the neural network to activate a first set of nodes (e.g., an input level) in the neural network. The feature values are weighted and transformed by a function, and then passed to another level in the neural network (which represents another set of nodes). This continues until an output neuron (or node) is activated that corresponds to a pattern (e.g., a speech unit, a handwriting character, etc.) represented in the input signal.

Deep neural networks (DNNs) are neural networks with a relatively large number of levels (or multiple layers of nodes) between the input and output layers. Deep neural networks are thus a powerful tool for modeling complex non-linear relationships. Therefore, they are powerful for performing many character recognition tasks, such as large vocabulary speech recognition. By way of example, some speech recognition systems employ deep neural network acoustic models using millions of parameters. The deeper networks can represent certain function classes better than shallower networks, and the use of deep networks can offer both computational and statistical efficiency for complex tasks.

Training a deep neural network with a large number of layers, however, can be difficult. This is because, during training, the training system attempts to attribute error values to the different parameters in the model using back propagation. This is often done by computing the derivative of the error function with respect to the parameters. Since the activation functions in the neural network often include a compressive non-linear component, this leads to a compression of the error gradient that propagates through that non-linearity. The compression increases with the number of levels, through which the error gradient is propagated, in the neural network. The gradient thus vanishes exponentially with the number of layers it passes through causing training to slow considerably.

To address this gradient vanishing problem, some have attempted to perform unsupervised pre-training to help train deep networks with improved parameter initialization. Others have attempted to change the loss function by introducing batch normalization to the individual hidden layers, in addition to the overall objective at the output layer. Training and evaluating a deep neural network, using these techniques, can consume a great deal of computational overhead, resulting in undesirably high computation costs.

SUMMARY

The mirror deep neural networks (DNNs) as described herein recognize patterns in an input signal. Mirror DNNs regularize to a linear function and train very quickly. Mirror DNNs employ a neural network pattern recognizer that can be used for any or all of pattern recognition, prediction, interpolation, exploration or any function of an input (features, text, image, sequence, etc). The pattern recognizer receives a set of features extracted from an input signal and inputs the set of features into a multi-layer neural network. The multi-layer neural network has an input layer that receives the set of features, a plurality of intermediate layers, and an output layer that generates a set of output values that are indicative of a recognized pattern exhibited in the input signal. In one implementation, one or more of the intermediate layers of the Mirror DNN have input connections from nodes of an immediately preceding layer of the neural network which operate on values received from the immediately preceding layer using a first non-linear equation. The resulting values are duplicated to create a first group of values and a second group of values. The first group of values are operated on using the first non-linear equation to create a modified first group of values and the second group of values are operated on using a second non-linear equation to create a modified second group of values. The first and second non-linear equations are chosen so as to make the values received from the first and second groups of nodes of the mirror level, once summed (or in some cases otherwise operated on), exhibit linearity. A mirror level of the intermediate layer has a first group of nodes that receive the modified first group of values each of which is multiplied by a first half of weight values in a first matrix of weight values. The mirror level also has a second group of nodes which receive the modified second group of values each of which is multiplied by a second half weight values in a second matrix of weight values. The mirror level also has output connections from the first and second groups of nodes of the mirror level to an output level of the intermediate layer. The output level receives and sums the values output by the first and second groups of nodes of the mirror level and produces a set of output values for that layer which are indicative of the intermediate internal representation computed at that layer. Multiple layers can be stacked in a DNN. The output of the last layer has output values that are indicative of a recognized pattern exhibited in the input signal. The recognized pattern can be used for various applications such as, for example, speech recognition, handwriting recognition, image recognition, facial recognition, and so forth. It should be noted that in some implementations the order of the mirror layer and other intermediate layers can be reversed.

The Mirror DNN can be trained by inputting multiple sets of training features. For each set of training features input, a set of output values are compared to a set of expected output values associated with the input training set under consideration and an error value is obtained for each comparison. A back propagation is then performed by back propagating the error values through the multiple layers of the neural network to modify the first matrix and second matrix of weight values. The multiple sets of training features are then iteratively input into the Mirror DNN using the modified first matrix and second matrix of weight values until the error values converge with the expected output values. In some implementations a regularizer is applied during training to affect the first and second matrix of weights so as to make some values of the intermediate layer closer to a linear function of its input.

Mirror DNNs are advantageous in that they train to recognize patterns in an input signal more quickly than traditional DNNs because they only deviate from computing a linear function as much as needed to fit the training data. Better and faster training can result in requiring fewer layers while yielding better performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2A is a block diagram illustrating the structure of a layer in a standard DNN. FIG. 2B is a block diagram showing the two non-linearities in FIG. 2A collapsed into one non-linearity represented by σ. FIG. 2C is a block diagram showing a difference in the order of how the weight matrix and the non-linearity are applied.

FIG. 3A is a diagram illustrating the structure of a layer of a Mirror DNN as described herein. FIG. 3B is a diagram illustrating the structure of a layer of a Mirror DNN as described herein, with two non-linear functions $\sigma_1$ and $\sigma_2$. FIG. 3C is a diagram illustrating the structure of a layer of a Mirror DNN as described herein, where the order of the computation of the non-linearity and the multiplication by a linear matrix has been reversed.

FIG. 5 is a symbolic representation of FIG. 3B.

FIG. 7A and FIG. 5 are identical. For $\sigma_1(x)=\sigma(x)$, $\sigma_2(x)=-\sigma(-x)$, $A=W_i$, and $B=V_i$, FIG. 7B is a symbolic representation of FIG. 3C.

FIGS. 8A and 8B (collectively referred to as FIG. 8) show a flow diagram illustrating one example of the operation of the architecture shown in FIG. 1 in performing pattern recognition using a Mirror DNN.

DETAILED DESCRIPTION

Figure 1:
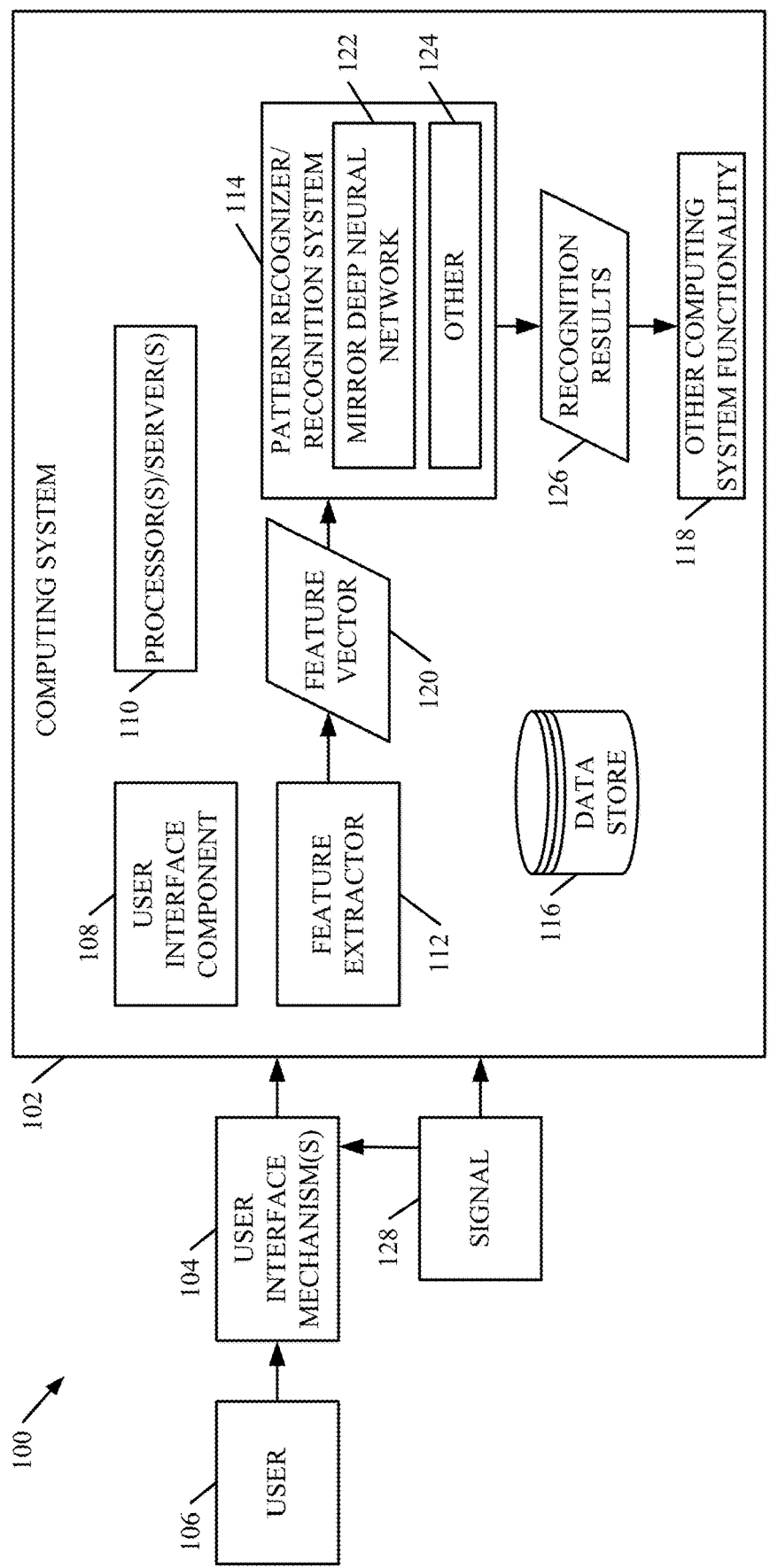
FIG. 1 is a block diagram of one example of a computing system architecture that can be used to practice the Mirror DNN described herein.

Various technologies pertaining to identifying patterns in a physical signal are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

1.0 Mirror Deep Neural Networks

The following sections provide an introduction to Mirror DNNs described herein, an overview and background of DNNs in general, as well as exemplary embodiments of a system and processes for practicing Mirror DDNs. Details of various embodiments and components, as well as exemplary mathematical computations are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Exemplary System for Employing a Mirror DNN

FIG. 1 is block diagram of one example of a computing system architecture 100 that can be used for employing a Mirror DNN. Architecture 100 illustratively includes computing system 102, similar to that discussed in greater detail with respect to FIG. 12, and user interface mechanisms 104. User 106 illustratively interacts with user interface mechanisms 104 in order to control and manipulate computing system 102.

Computing system 102, itself, illustratively includes user interface component 108, one or more processors or servers 110, a feature extractor 112, pattern recognition system or pattern recognizer 114, data store 116, and other computing system functionality 118. The pattern recognition system or pattern recognizer 114 can be used for any or all of pattern recognition, prediction, interpolation, exploration or any function of an input (features, text, image, sequence, etc). Feature extractor 112 illustratively receives an input signal 128, in some cases, from one or more user interface mechanisms 104. The signal 128 illustratively represents information (such as a pattern) to be recognized by pattern recognizer 114. In one example, the feature extractor 112 illustratively extracts a set of features (such as feature vector 120) from the input signal 128. Feature vector 120 is provided to pattern recognizer 114. System 114 illustratively includes a Mirror DNN 122 and it can include other items 124. The feature vector 120 is applied to Mirror DNN 122, which illustratively generates a set of recognition results 126. Recognition results 126 illustratively identify the pattern represented by the feature vector 120.

As a more concrete example, user interface mechanism 104 can be a microphone that receives an utterance from user 106 and generates a signal indicative of the utterance. Feature extractor 112 can be an acoustic feature extractor that extracts the feature vector 120, as a set of acoustic features, and provides it to pattern recognition system 114. The acoustic features are applied to the Mirror DNN 122 that generates a speech recognition result 126 indicative of the speech represented by the feature vector 120. In that example, other computing system functionality 118 can include a language model, a speech-to-text component that generates a textual output based on the speech recognition result 126, the textual output being indicative of the spoken utterance spoken by user 106, a natural language understanding system, etc.

Computing system 102 can be a variety of different computing systems. For instance, it can be a handwriting recognition system where user interface mechanism 104 is a touch sensitive screen that generates a signal indicative of a handwriting input provided by user 106, on the touch sensitive screen. In that case, the recognition results 126 may be a letter or other character corresponding to the handwriting input. The system may be an image recognition system (such as a facial recognition system, or another image recognition system) where a user interface mechanism 104 is an image capture device, such as a camera, or another image capture device that generates a signal representative of a captured image. The recognition result 126 may be a facial recognition result that identifies an individual, based upon the pattern recognized in the feature vector generated from the image received. These are examples only.

1.2 Background: Overview of Deep Neural Networks

Before describing the structure of the Mirror DNN 122 in more detail, a brief overview of deep neural networks will first be provided. The first sub-section of this overview explains how neural network convergence is governed by the ratio of the eigenvalues of the Hessian of the error function. The higher the ratio, the slower the learning. The second sub-section demonstrates how data and architecture can both contribute to high ratios of eigenvalues. The third sub-section explains how DNNs became successful by reducing the distribution spectrum of eigenvalues through clever engineering (and sometimes by accidents). A deliberate approach to reducing the eigenvalue spectrum is also discussed.

1.2.1 Learning Convergence in a DNN is Governed by the Eigenvalues of the Hessian DNNs are functions $F:(W,X) \rightarrow Y$ that map an input $X \in \mathbb{R}^n$ and a parameter $W \in \mathbb{R}^k$ to an output $Y \in \mathbb{R}^m$. They are trained to minimize a loss function $L: \mathbb{R}^m \times \mathbb{R}^m \rightarrow \mathbb{R}$ over a training set T of pairs $(X_p, T_p) \in \mathbb{R}^n \times \mathbb{R}^m$. The global error function is given by:

$$E(W) = \sum_{p \in T} E_p(W) = \sum_{p \in T} L(F(W, X_p), T_p)$$

Vanilla batch gradient descent can be summarized by the weight update:

$$W^{t+1} = W^t - \eta \frac{\partial E(W)}{\partial W}$$

where $\eta$ is a learning rate. Stochastic gradient descent can be written as doing local updates of the weights for each pattern p in the training set and doing multiple passes over the training set:

$$W^{t+1} = W^t - \eta \frac{\partial E_p(W)}{\partial W}$$

The computation of $$\frac{\partial E_p(W)}{\partial W}$$

only involves one pattern, so it is much faster than the computation of $$\frac{\partial E(W)}{\partial W}$$

over the entire training set. Stochastic gradient descent updates the weight after each pattern presentation. If the data is correlated, as it is almost always the case over large sets, batch gradient descent computes very similar gradients over correlated data without making progress, which is a form of duplication of computation. In contrast, stochastic gradient descent makes progress in the weight space after each pattern gradient is computed. Each pattern provides a noisy (hence the term stochastic) estimate of the batch gradient, but in average progress is made much quicker than a single batch update, because there is far less duplicated computation over correlated data.

In both cases, the convergence speed is governed by the second derivative of the error, or the Hessian. The second derivative of the error measures the variation of the gradient, or the curvature of the loss function. Multiplying the Hessian by an epsilon size gradient vector yields an approximation of the next gradient vector. From this observation, it follows that the eigenvectors of the Hessian are the directions in which successive gradients are collinear. If the energy function is approximated by a quadratic function around a minima and looks like a taco shell, the eigenvectors of the Hessian are the axis of the taco shell, and the eigenvalues are the respective curvature along these axes. The steep axis of the taco shell governs the maximum learning rate.

If the learning rate $\eta$ is larger than $2/|\lambda_{max}|$, where $\lambda_{max}$ is the largest eigenvalue (the maximum curvature), the weight update will diverge (successive updates increase $E(w)$) and the optimization will bounce out of the taco shell along the steep axis. The optimal learning rate to converge to the bottom of the taco shell is $\eta=1/|\lambda_{max}|$. However, this is not optimal for converging to the local minima by following the gradient along the valley axis since the curvature there is lower and possibly much lower. A reasonably optimal learning rate is likely to be a few percent smaller than $2/|\lambda_{max}|$. The learning speed is governed by the speed of convergence over axis of lower curvature (bottom of the valley) once $\eta$ is fixed by the highest curvature. Thus, it is the ratio between the top eigenvalue and the smaller eigenvalues that controls learning speed.

Second order methods and preconditioning essentially project the gradient along the eigenvectors and rescale the projected component by the corresponding eigenvalue. This is equivalent to making the taco shell more spherical, such that the gradient points toward the local minima instead of the bottom of a steep valley. However, second order methods only provide partial help because $E(w)$ is not truly quadratic, stochastic gradient descent typically works faster than applying a second order on a large batch, and mini-batches only provide noisy estimates of a "spherical" gradient. Convergence is dictated by the distribution of the eigenvalue of the Hessian.

1.2.2 Causes of Hessian Widespread Eigenvalues

The following a paragraphs describe the causes of Hessian widespread eigenvalues.

1.2.2.1 High Eigenvalue Ratios in the Hessian Can Result from the Data

Data: Imagine one has a spherical $E(W)$ with two weights, $W=(w_0, w_1)$. There are two patterns:

A:X=(1,1),Label=1

B:X=(1,−1),Label=0

The classification function is:

$F(X,W)=w_0 x_0 + w_1 x_1$

Assuming a mean square loss function $$L(Y, T) = \frac{1}{2}(Y - T)^2,$$

the cost function over all the patterns (A and B) is:

$$E(W) = \frac{1}{2}(w_0 + w_1 - 1)^2 + \frac{1}{2}(w_0 - w_1)^2$$

The gradient is:

$$\frac{\partial E(W)}{\partial W} = (2w_0 - 1, 2w_1 - 1)$$

The Hessian is:

$$\begin{bmatrix} \frac{\partial^2 E(W)}{\partial w_0 \partial w_0} & \frac{\partial^2 E(W)}{\partial w_0 \partial w_1} \\ \frac{\partial^2 E(W)}{\partial w_1 \partial w_0} & \frac{\partial^2 E(W)}{\partial w_1 \partial w_1} \end{bmatrix} = \begin{bmatrix} 2 & 0 \\ 0 & 2 \end{bmatrix} = 2I$$

where I is the identity. The minimum of E occurs at $(w_0, w_1)=(0.5, 0.5)$. All vectors are eigenvectors and the eigenvalue is 2. The curvature at the minimum is the same in all directions.

If instead of having A and B, in the training set, one instead has 1000 A and only 1 B, the resulting equation is:

$$E(W) = \frac{1000}{2}(w_0 + w_1 - 1)^2 + \frac{1}{2}(w_0 - w_1)^2$$

The gradient is:

$$\frac{\partial E(W)}{\partial W} = (1001w_0 + 999w_1 - 1{,}999w_0 + 1001w_1 - 1)$$

And the Hessian is:

$$\begin{bmatrix} \frac{\partial^2 E(W)}{\partial w_0 \partial w_0} & \frac{\partial^2 E(W)}{\partial w_0 \partial w_1} \\ \frac{\partial^2 E(W)}{\partial w_1 \partial w_0} & \frac{\partial^2 E(W)}{\partial w_1 \partial w_1} \end{bmatrix} = \begin{bmatrix} 1001 & 999 \\ 999 & 1001 \end{bmatrix}$$

The solution is still $(w_0, w_1)=(0.5, 0.5)$. The Hessian has an eigenvector of $(1,1)$ with eigenvalue 2000 and an eigenvector of $(1, -1)$ with eigenvalue of 2. Proof:

$$\begin{bmatrix} 1001 & 999 \\ 999 & 1001 \end{bmatrix}\begin{bmatrix} 1 \\ 1 \end{bmatrix} = \begin{bmatrix} 2000 \\ 2000 \end{bmatrix} = 2000\begin{bmatrix} 1 \\ 1 \end{bmatrix}$$

$$\begin{bmatrix} 1001 & 999 \\ 999 & 1001 \end{bmatrix}\begin{bmatrix} 1 \\ -1 \end{bmatrix} = \begin{bmatrix} 2 \\ -2 \end{bmatrix} = 2\begin{bmatrix} 1 \\ -1 \end{bmatrix}$$

In other words, the curvature along the direction $(1,1)$ is 1000 times stronger than the curvature along the direction (1, −1). It will take 1000 times longer to learn pattern B than pattern A, once the learning rate is fixed (to the largest value that does not diverge in the (1,1) direction).

The example above demonstrates the effect of data on the spectrum of the eigenvalues of the Hessian. In this simple case, one could in theory fix the problem with preconditioning of the input by rotating the input 45 degrees and rescaling $x_0$ and $x_1$ to make the curvature uniform around the minimum. In general, preconditioning is neither foolproof nor cheap. Data can create curvature ratios that cannot be corrected by transforming the input. Consider the case of a multi-layer network. At any given layer, it is quite plausible that after some training, a layer computes a feature that is active for a small fraction of the data while some other feature at a different layer could be active for a much larger fraction of the data. Curvature along direction in the weight space that depends on these features is likely to vary greatly, even at the same layer. This is not different from having 1000 A and only 1 B in the example above. The training process can pass through regions of the weight space where the ratio of eigenvalue (curvatures) of the Hessian is large. When this happens, there are directions in the weight space where very little progress is made. Learning is typically fast at the beginning of training, as the weight vector value reaches the bottom of the valley, and slows, once the weight vector value travels at the bottom of the valley toward a lower minimum (or a saddle point that leads to a different valley).

1.2.2.2 High Eigenvalue Ratios in the Hessian Can Result from the Architecture

For a DNN using sigmoid units initialized to very small weights, the gradient decreases each time is passes through a sigmoid unit by at least a factor of 4. This is because:

$$f(x) = \frac{1}{1+e^{-x}}$$
$$0 < \frac{\partial f(x)}{\partial x} = \frac{e^{-x}}{(1+e^{-x})^2} \leq \frac{1}{4}$$

If the network has small weights, the gradient also decreases when going through these weights. But things can get worse when the weights grow. That is because when $f(x)$ becomes saturated, $$\frac{\partial f(x)}{\partial x}$$

tends to be exponentially close to 0 and the gradient is virtually blocked. If for some layer, all the units are saturated, virtually no gradients can go through for that pattern. The lower representations are learned at glacial speed. In general, the curvature along the direction of changing the lower layer (closer to the input) is much lower than the curvature along the direction of changing the higher layer (closer to the output). The good news is that while architecture can cause high eigenvalue ratios, clever design and engineering can mitigate the problem.

1.2.3 Evolution of DNNs

The following paragraphs describe the evolution of DNNs.

1.2.3.1 Supervised and Unsupervised Pre-Training:

Before 2005, training deep networks with sigmoids took a very long time for the reasons mentioned in the previous section.

One clever trick to speed up training is by using pre-training. Since it takes a long time to train the lower layer of a neural network, the idea in pre-training is to train the layers separately. The pre-training trick is to connect the output via a spurious layer to the first layer of hidden units. The training is relatively fast until the units of the first hidden layer are saturated, at which stage, the gradient ceases to go through and the learning slows down dramatically. Once the training has converged, the spurious layer is discarded, but the trained weights of the first layer are kept. The output is then connected to the second layer of hidden unit, and assuming a three layer NN the NN is trained (with the weights of the first layer initialized). The weights of the first layer do not change much because the units of the first layer are saturated. Alternatively, it is possible to freeze the weights of the first layer. As before, the spurious layer is discarded, but the weights of the second (and the first) are kept. This procedure is repeated until all the layers are trained. This procedure is a bit complex and not optimal globally, but it achieves much better results than standard training with DNNs. It circumvents the eigenvalue ratio mentioned in the previous section.

Another form of pre-training was described in a paper by Hinton, Geoffrey E., and Ruslan R. Salakhutdinov. "Reducing the dimensionality of data with neural networks." *Science* 313.5786 (2006): 504-507. The paper describes building a deep auto-encoder, but as before, the pre-training is done one layer at a time (using a different algorithm, restricted Boltzmann Machines (RBMs)), with a final step of fine-tuning over the whole network. Again, pre-training circumvents the large eigenvalue ratio and the results are very good.

In both of these cases, the large eigenvalue ratio caused by the architecture has been circumvented. However, most of the training is done by a local procedure, with a final step where training is done globally. In the last step, there are deep valleys with large eigenvalue ratios. However, the valley created by pre-training is very good and converges toward the bottom of the valley is better than the previous method without requiring any travel along the bottom of the valley.

Pre-training is where DNNs were first "unlocked". The following three engineering breakthroughs each led to new records on famous data sets.

1.2.3.2 ReLU:

In 2012, Alex Krizhevsky, Ilya Sutskever, and Geoffrey Hinton published a paper "ImageNet Classification with Deep Convolutional Neural Networks", Proceedings of *Advances in Neural Information Processing Systems* 25 (*NIPS* 2012)" that broke ground on the ImageNet data set. There are several noteworthy achievements in that paper, but one that is particularly important is the use of ReLUs, or Rectifier Linear Unit. The ReLUs were used "by accident" because of the function tan h(x) "In terms of training time with gradient descent, these saturating nonlinearities are much slower than the non-saturating nonlinearity f(x)=max (0, x)." (quote from the paper). However, the use of ReLUs instead of sigmoid functions has a dramatic impact on the eigenvalue ratio. This is because at every ReLU layer, half the gradient can go through untouched (depending on whether x is greater or less than 0). This is much better than a sigmoid function, which drops 75% of the gradient at best, and exponentially close to 100% as units get saturated. The paper shows a picture where: "A four-layer convolutional neural network with ReLUs (solid line) reaches a 25% training error rate on CIFAR-10 six times faster than an equivalent network with tan h neurons . . . . The learning rates for each network were chosen independently to make training as fast as possible." This is a manifestation of the effect on eigenvalues. The result of the 2012 papers on ImageNet were ground breaking. It works so well that with ReLUs, pre-training is no longer needed.

1.2.3.3 Batch Normalization:

ReLUs still have the problem of dropping gradients at each layer (half when initialized with random weights at the beginning), as a function of learning. A paper by Ioffe, Sergey, and Christian Szegedy with the title "Batch normalization: Accelerating deep network training by reducing internal covariate shift" in Proceedings of The 32nd International Conference on Machine Learning (ICML), pp. 448-456, 2015, addressed this problem at ICML 2015. The idea in batch normalization is to group the patterns in batches and to enforce the average and variance of each unit be constant over the batch. This reduces the covariate shift of the input of each layer. The first layer sees the input from the training set, and one can assume that it comes from a constant distribution. The second layer, however, sees a shifting distribution of its input because it is going through the first layer which is learning over time. The second layer then has to retrain constantly because the distribution of the first layer is changing continuously (this is what the authors call the covariate shift) as the first layer learns. The third layer, has to follow suite, adapting to a layer which is itself adapting to a previous layer. This continues with deeper networks and the authors argue that it is slows learning. The authors further argue that fixing the average and variance of each layer stabilizes the covariate shifts and speeds up learning. The experiments corroborate their hypothesis by showing 10× to 100× speedup improvements.

The covariate shift explanation, however, is not satisfactory. Forcing units to have zero average is not difficult and forcing units to have a constant variance is akin to asking the linear layer to preserve distances. In other words, batch-normalized linear layers (between the non-linear unit layer) are akin to isometries—linear transformations that preserve the distance, such as a rotations or symmetries. Note the batch normalized linear layers are not exactly isometric because instead of preserving the norm of an activation, they preserve energy (variance with zero mean) for each unit over each batch. But it is easier to think of them as isometries, in terms of the constraints imposed on the weight matrices. Restricting linear layers to isometries does not have much of an effect on capacity (for a n by n matrix, the subspace of isometry has n(n−1) dimensions instead of $n^2$). If the linear layers are doing rotations, one would imagine that as the first layer rotates the distribution as a function of training, the second layer needs to adapt to the resulting distribution (covariate shift). Each layer needs to adapt to the isometry change of the preceding layer. Since the space of isometries has roughly the same dimension as the unrestricted space, it is hard to believe that batch normalization has solved the problem of covariate shift. If one reasons in terms of batch normalized-layers instead of isometries, the linear network is moving energy per unit along the activation of each pattern within each batch to keep the unit energy constant over the batch. Each layer has to adapt to the shifts of the previous layer, so the reducing the covariate shift argument is not very plausible.

A better explanation is that batch normalization helps with the backward propagation. The weight matrix of the activation going forward has the same eigenvalues of the weight matrix going backward because the two matrices are transposed. Therefore, the energy of the gradient per unit per batch is roughly maintained by batch normalization. If the average amount of gradient that goes to each unit is kept constant over time at each layer (no systematic drop as a function of the data or the layers), this bodes well for the ratio of eigenvalues between moving in the direction of weights at layers near the output and the direction of weights at layers near the input. Batch normalization compensate for the 50% drop in gradient per layer resulting from using ReLUs. If gradients were perfectly decorrelated and half of the gradient were lost at each layer, one could argue that a 10-layer network would see a ratio of 1024=2^10 magnitude difference between the second derivative of the energy function for weights at the top and weights at the bottom of the NN. Batch-normalization reduces this ratio substantially by rescaling not only the activation of the units to have a unit variance (as the author claim) but more importantly by rescaling the gradients (going backward). The variance preserving constraints of batch-normalization of unit activation also preserve the variance of the gradients between layers. This is true because the eigenvalue of a matrix (going forward) and the eigenvalue of its transposed (going backward) are identical. Batch-normalization prevents gradients from vanishing or exploding. Stated less dramatically, batch-normalization evens out the Eigen values of the Hessian across layers. Not surprisingly, this make optimization easier and can easily explain 1 or 2 order of magnitude speed improvement, as well as better generalization.

1.3.2.4 Residual Networks:

For a DNN with n layers, the quantities $$\frac{\partial E(W)}{\partial w_i}$$

can still vary widely depending on the distance of $w_i$ from the output, due to the non-linearity at each layer. The non-linear aspect is important because the Hessian is composed of second order derivatives. Linear units have 0 second order derivatives and batch normalization would simplify learning greatly if all the units were linear. But with non-linear units, the second derivative can create wide variations across the terms of the Hessian and these variations can be compounded with deep networks.

A paper by Kaiming He, Xiangyu Zhang, Shaoqing Ren and Jian Sun entitled "Deep Residual Learning for Image Recognition", arXiv: 1512.03385v1 10 Dec. 2015, addressed this problem cleverly in 2015. The authors noticed that when training very deep networks, adding additional layers can lead to a degradation of the training error. The authors show that this is an optimization problem. They constructed a DNN by adding identity mapping as additional layers to a pre-trained DNN. When further training occurs, their solver yields worse results than the original network. Their insight was to complement an identity mapping (linear) with a non-linear DNN. From an optimization standpoint, looking at the DNN, this is much better because adding an identity mapping to a DNN is akin to adding a constant to the eigenvalues of the Hessian. The reasoning is that if the residual network is initialized with small weights, the complete residual network computes the identity, which is well conditioned (all the eigenvalues are close to 1) regardless of the number of layers. Indeed, if the weights are initialized to 0, then the eigenvalues are exactly equal to 0. During training, the weights become larger but the deviations are spread across many layers and at each layer, the identity remains the larger contributor. The identity shortcuts provide gradients of similar magnitude to every layer which means that the variations of gradients (the second derivatives of the Hessian) are comparable for all the weights.

1.4 Mirror DNNs

The following sections describe Mirror DNNs and provide exemplary computations for them.

1.4.1 Discussion of Exemplary Computations for Mirror DNNs

In the previous sections, three important tools were introduced which reduce the spread of eigenvalues:
1. The use of ReLU units, which makes gradients far more uniform than sigmoid units.
2. Batch normalization, which rescales gradients from layer to layer.
3. Residual networks, which distribute gradients from the output layer to all the layers below, and keep the weights to small (residual) values.

All three tools make optimization easier by reducing the eigenvalues of the Hessian.

The following section describes Mirror DNNs and how they are derived. ReLU units emerge from interpreting hidden layers as a logistic classifier over hidden events. Residual networks also come out as a particular case of a general architecture. And batch normalization is one of many possible tools to keep the weights of each layers in comparable range.

First, consider logistic regression (single layer) when the input is made of probabilities (possibly from a ratios of counts). The logistic regression architecture is a linear layer followed by a logistic function:

$$\text{logistic}(x) = \frac{1}{1+e^{-x}}$$

When the input to a logistic regression classifier comes from probabilities, counts, or power, it is a common practice is to take the Log as a pre-processing step. This is a common practice for a wide variety of features, such as TF-IDF, speech, and event counts such as:

$$p_i = \frac{r + n_{1i}}{1 + n_{1i} + n_{0i}}$$

where $n_{1i}$ denotes the count of occurrence of event i, $n_{0i}$ denotes the count of the non-occurrence of event i, and r is a default bias which takes effect when there are no events and $n_1 = n_0 = 0$. In this case $p_i = r$. The typical features look like this:

Log of probability:

$$\log(p_i)$$

Log odds:

$$\log\left(\frac{p_i}{1-p_i}\right) = \log(p_i) - \log(1-p_i) = \log\left(\frac{r + n_{1i}}{1 - r + n_{0i}}\right)$$

The reason why log and log odds work so well is because of the use of the logistic function. The logistic function contains an exponential, so taking the log brings the problem back to a space that scales proportionally. The log odds function is also called the logit function, defined by:

$$\text{logit}(x) = \log\left(\frac{x}{1-x}\right)$$

It is exactly the reverse of the logistic function:

$$\text{logistic}(\text{logit}(x)) = \text{logit}(\text{logistic}(x)) = x$$

To linearly separate a space of features made out of probabilities effectively with logistic regression, it is a good idea to transform the probabilities to a log or log-odd space.

Now consider a multi-layer network where each layer contains a weight matrix, followed by logistic units. If each logistic unit is viewed as computing probability of an event (it is after all between 0 and 1), it follows that one should scale back the space by a log before taking an exponential in the following layer (in the logistic function). Not doing this imposes a burden on the network because it must compute a sensible function despite exponentiating the results or the previous layer at each layer.

The log(logistic(x)) function is commonly called softplus and is defined as:

$$\text{softplus}(x) = \log(1+e^x) = -\log(\text{logistic}(-x))$$

The function $f(x) = \log(\text{sigmoid}(x))$ is the differentiable approximation of a ReLU.

Figure 2A:
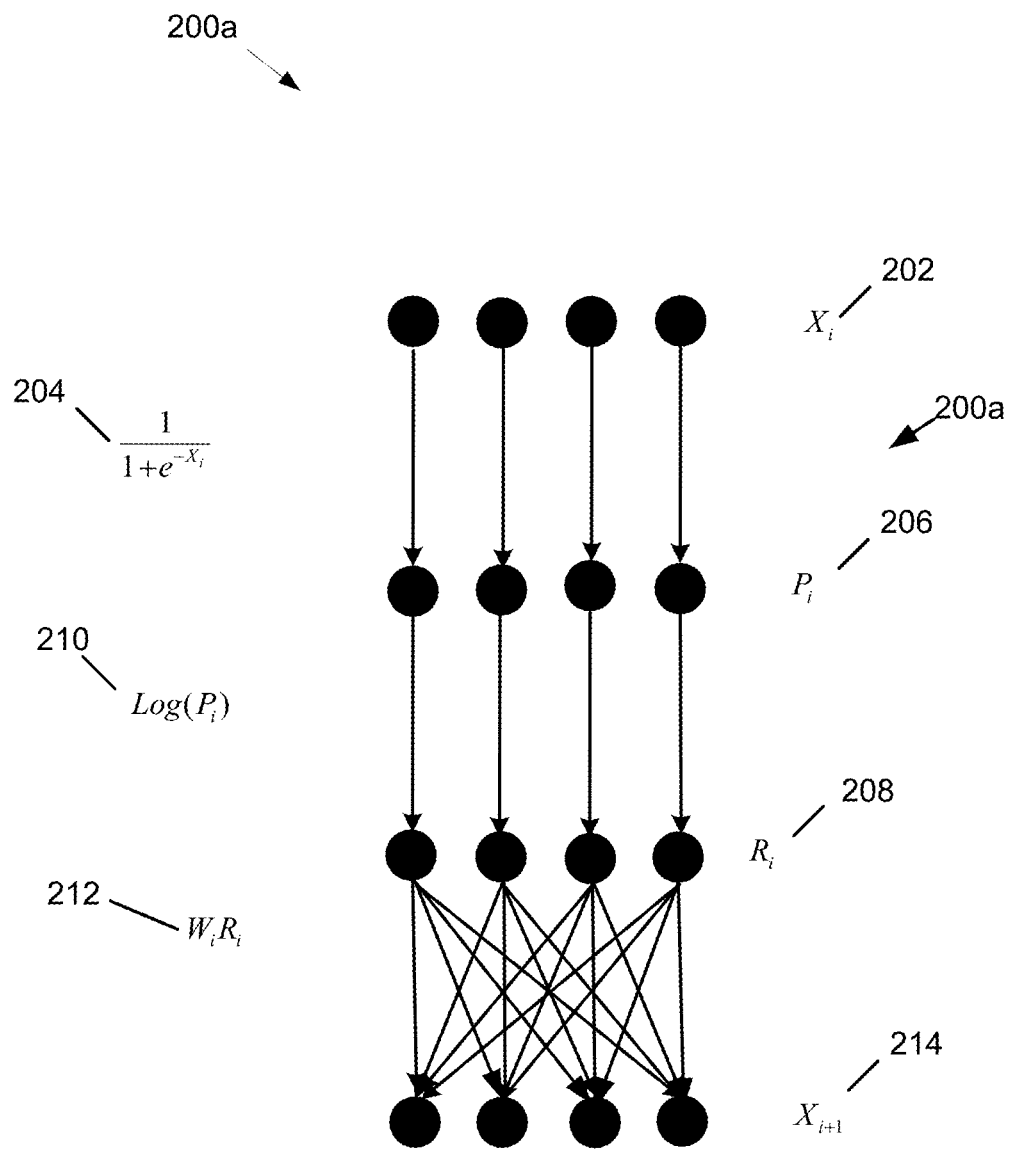
FIGS. 2A, 2B and 2C (collectively referred to as FIG. 2) depict a series of DNNs.

FIG. 2A provides a graphic representation 200a of a layer of a DNN. As before, the activations of each layer are represented by $X_i$ (202). A sigmoid function (204) is used to compute a layer $P_i$ (206) which can be interpreted as the probability of an event, and the layer $R_i$ (208) is used to represent the log of this probability. Considering again the activations as probability, the layer is extended to compute the log (p) component of a log-odd probability $$\left(\log\left(\frac{p}{1-p}\right)\right).$$

Figure 2B:
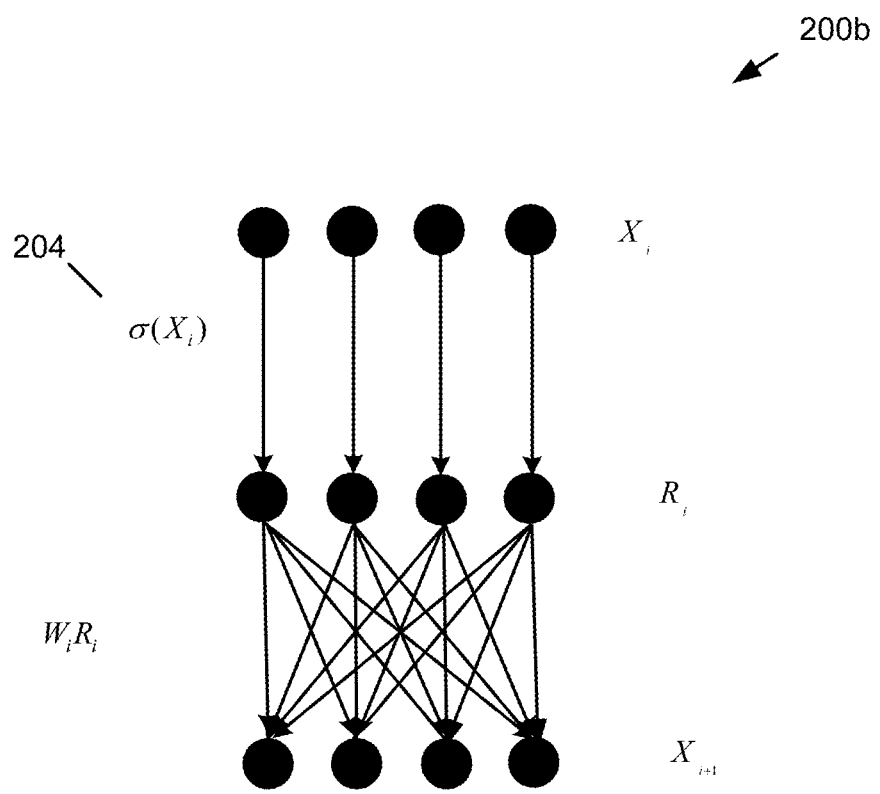
Figure 2C:
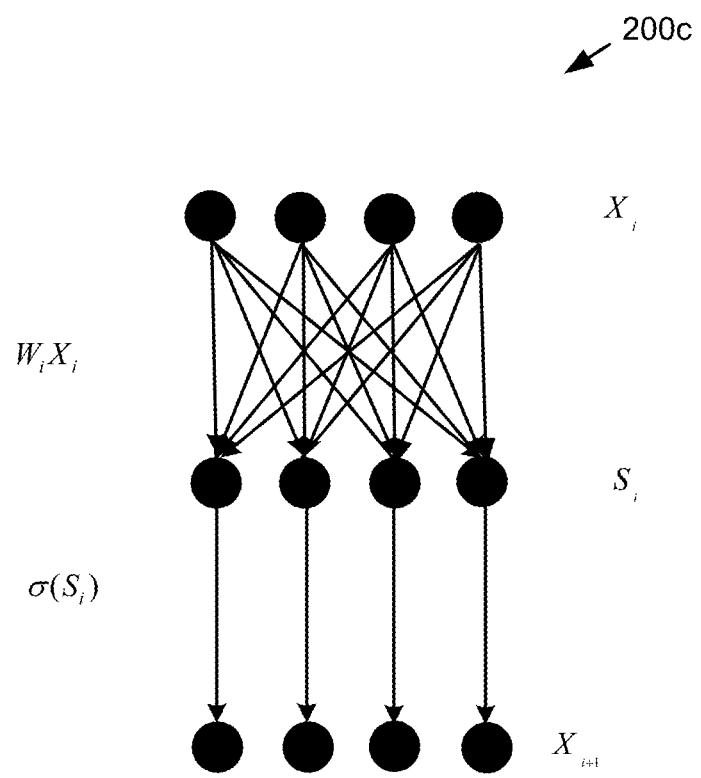

Graphic representations 200b and 200c of the layer shown in FIG. 2A are provided in FIG. 2B and FIG. 2C. In FIG. 2B, the two non-linearities in FIG. 2A. have been collapsed into one non-linearity 204 represented by σ. FIG. 2B and FIG. 2C differ only by the order in which the non-linearity and the weight matrix is applied.

The nature of two non-linearities and whether they are collapsed or not is not important for traditional networks. However, realizing that log(sigmoid(x)) is a continuous version of the ReLu function, and that one needs to also compute log(1−sigmoid(x)) to compute the log-odds was the insight that led to mirror DNNs. Similarly, inverting the order of applying the non-linearity and multiplying by a linear matrix is not important for traditional neural networks, but for mirror networks as described herein, one had to prove that interchanging the order still preserved the property that the non-linearity became linear for certain values of the weights.

Of the three configurations shown in FIGS. 2A, 2B and 2C, the configuration shown in FIG. 2C is the more commonly used in the neural network literature. In FIG. 2A and FIG. 2B, the number of units in $R_i$ do not have to match the number of units in $X_{i+1}$ if the matrix $W_i$ is not square. The same is true for the number of unit in $X_i$ and $S_i$ in FIG. 2C. However in FIGS. 2A, 2B, 3A, and 3B, the number of units in $X_i$ (202) has to match the number of units in $P_i$ (206), $R_i$ (208, 308), and $S_i$ (208, 312) because the non-linearity is a unit to unit operation.

Figure 3A:
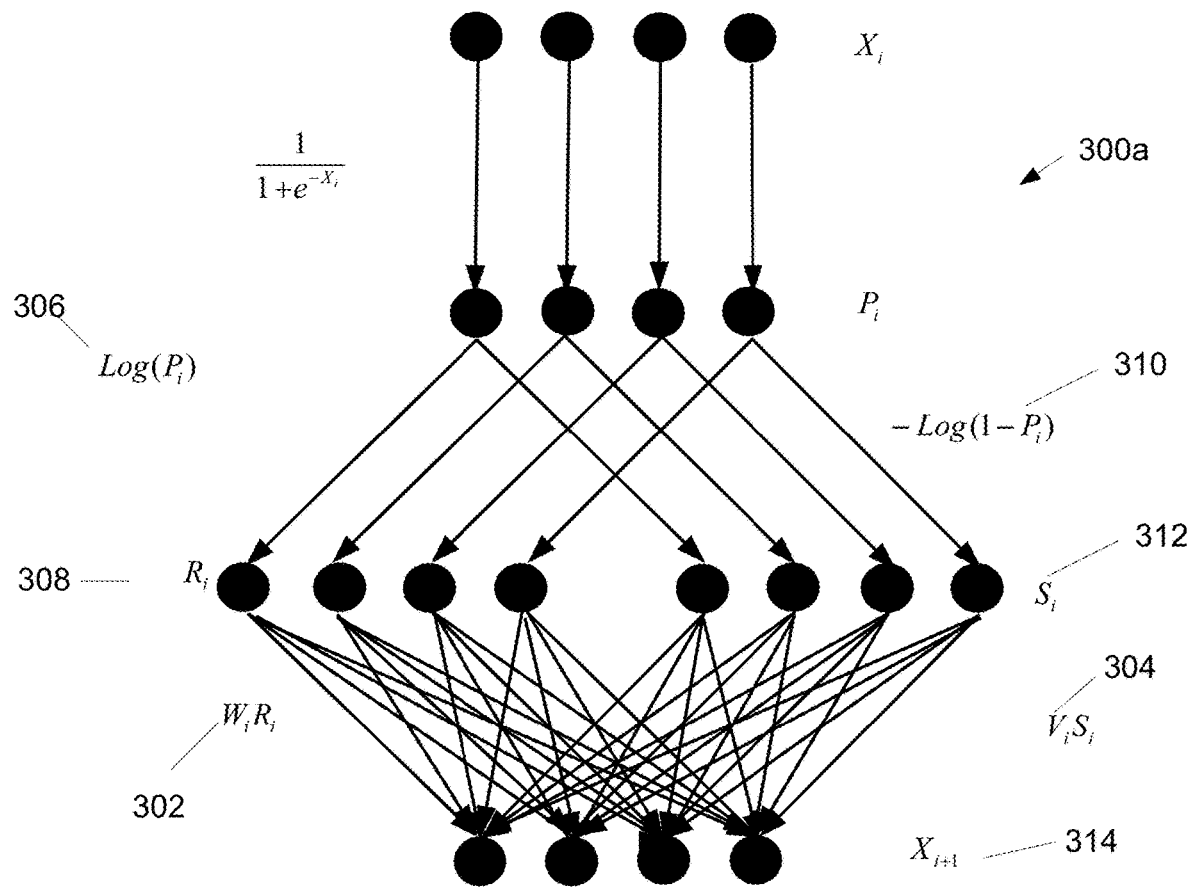
FIGS. 3A, 3B and 3C (collectively referred to as FIG. 3) depict a series of Mirror DNNs.

FIG. 3A depicts a Mirror DNN architecture 300a. This architecture 300a is called a Mirror DNN, because of the symmetry between $W_i$ 302 and $V_i$ 304. The architecture 300 computes both a log probability of an event in $R_i$ 306 and the log of the probability of the opposite event in $S_i$ 312. The Mirror DNN connects $S_i$ 312 to $X_{i+1}$ 314 with a new matrix of weights $V_i$ 304. For this architecture, the forward propagation can be written as $$X_i = W_{i-1}\sigma(X_{i-1}) + V_{i-1}(-\sigma(-X_{i-1}))$$

where $$\sigma(x) = \log(\text{logistic}(x)) = \log\left(\frac{1}{1+e^{-x}}\right)$$

and $$-\sigma(-x) = -\log(\text{logistic}(-x)) =$$
$$-\log\left(\frac{e^{-x}}{1+e^{-x}}\right) = -\log\left(1 - \frac{1}{1+e^{-x}}\right) = -\log(1 - \text{logistic}(x)).$$

Figure 3B:
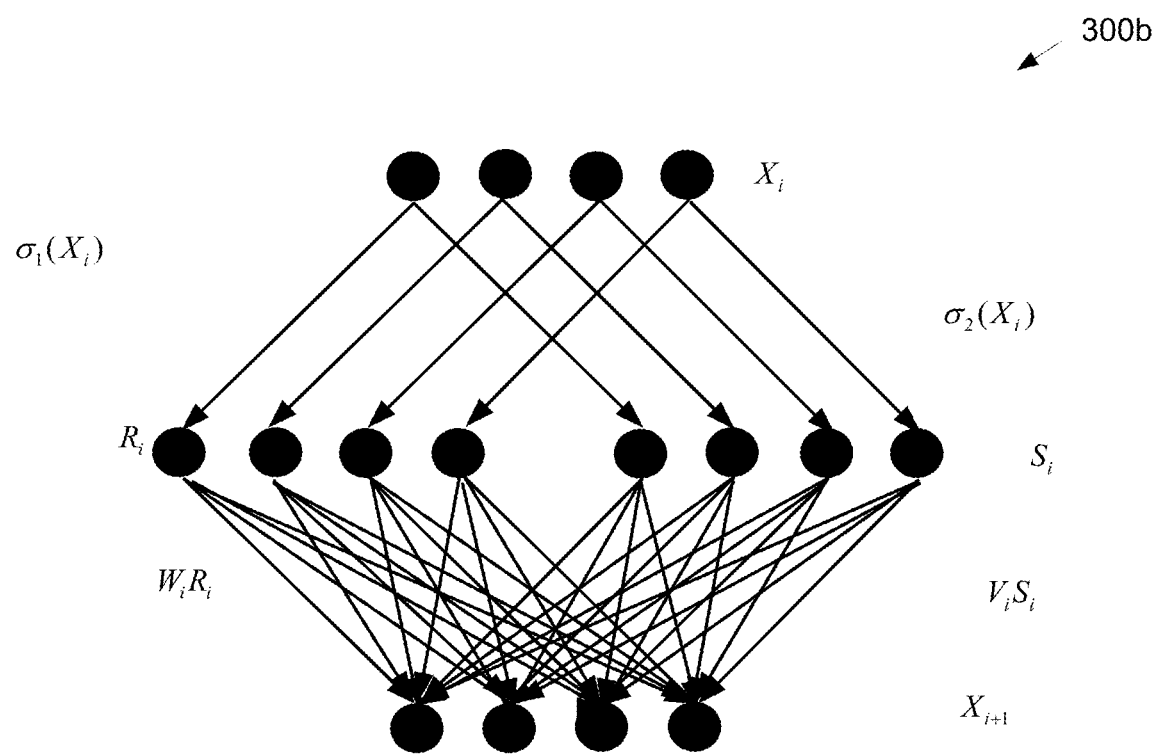

It should be noted that in FIG. 3B the architecture 300a shown in FIG. 3A is generalized to show the architecture 300b by using two collapsed non-linear functions $\sigma_1$ 306a and $\sigma_2$ 310b. If one defines $\sigma_1(x) = \sigma(x)$ and $\sigma_2(x) = -\sigma(-x)$ with the definition of $\sigma$ above, FIG. 3A and FIG. 3B depicts the same architecture.

Figure 3C:
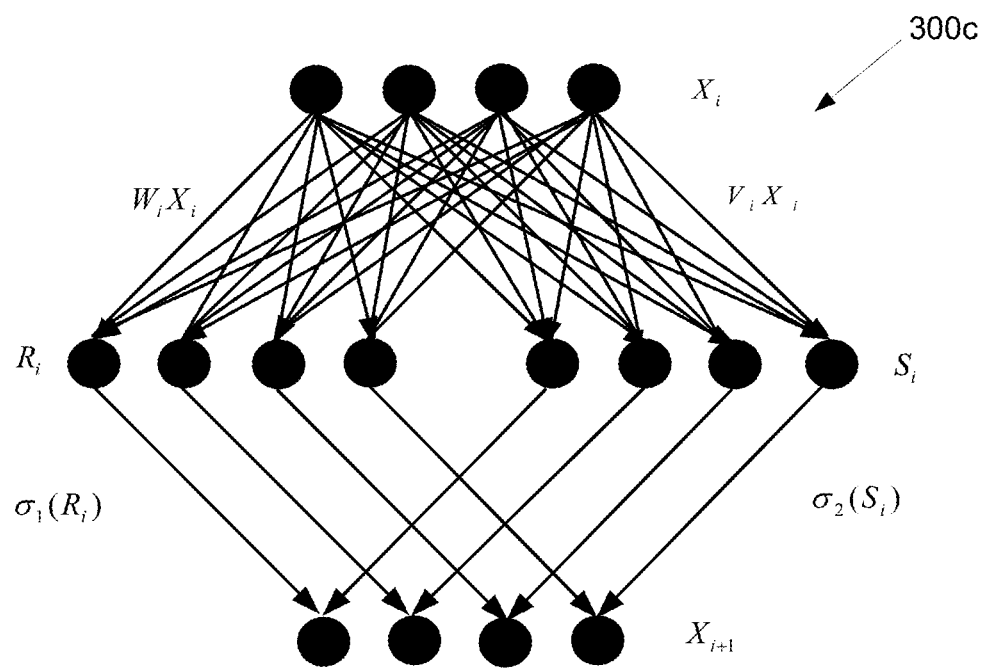

FIG. 3C is another implementation 300c of a mirror network, where the order of applying the non-linearity and multiplying by a matrix have been reversed.

Noticing that:

$$\sigma(x) - \sigma(-x) = \log\left(\frac{1}{1+e^{-x}}\right) - \log\left(\frac{e^{-x}}{1+e^{-x}}\right) = \log\left(\frac{1}{1+e^{-x}} \cdot \frac{1+e^{-x}}{e^{-x}}\right) = x$$

The forward propagation can therefore be written as:

$$X_i = (W_{i-1} - V_{i-1})\sigma(X_{i-1}) + V_i X_{i-1} = (W_{i-1} - V_{i-1})\sigma(-X_{i-1}) + W_{i-1}X_{i-1}$$

The following are good candidates for $\sigma$:

$$\sigma(x) = \max(x, 0)$$
$$\sigma_a(x) = \frac{1}{a}\log(1 + e^{ax})$$

because there is exists a linear combination of $\sigma(x)$ and $-\sigma(-x)$ that result in a linear function of x. Depending on $\sigma_1$ and $\sigma_2$, the relationship between $W_i$ and $V_i$ that makes the layer linear is different.

The following are good candidates for $\sigma_1$ and $\sigma_2$:

$$\sigma_1(x) = \sigma(x)$$
$$\sigma_2(x) = -\sigma(-x)$$

For this choice, $W_i = V_i$ makes the layer linear. For:

$$\sigma_1(x) = \sigma(x)$$
$$\sigma_2(x) = \sigma(-x)$$

The relation that makes the layer linear is $W_i = -V_i$. Assuming:

$$\sigma(x) = \max(0, x)$$
$$\sigma_1(x) = \sigma(x)$$
$$\sigma_2(x) = -\sigma(-x)$$

The following observations can be made:
If $V_i = 0$, then $X_{i+1} = W_i \sigma(X_i)$ the network is equivalent to any standard ReLu DNN.
If $V_i = W_i$, the layer becomes linear. Proof:

$$X_{i+1} = W_i \log(P_i) - W_i \log(1-P_i) = W_i \text{logit}(\text{logistic}(X_i)) = W_i X_i$$

Figure 4:
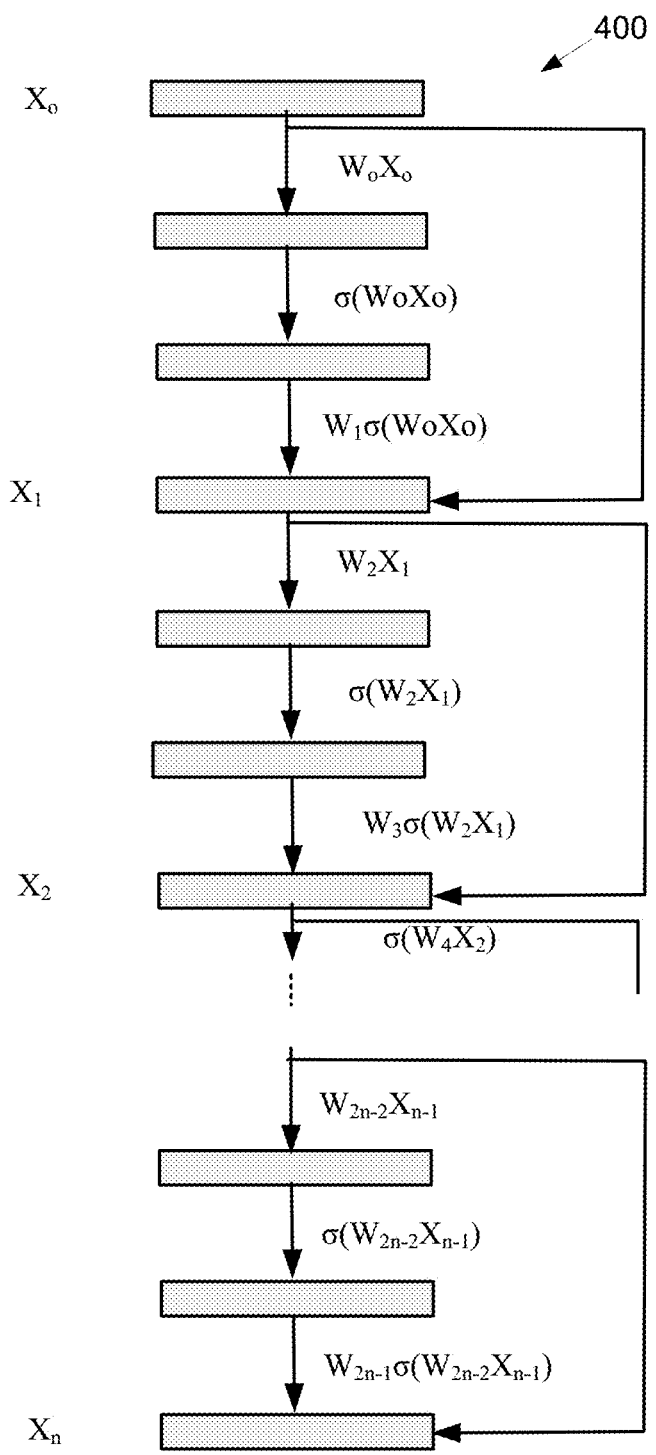
FIG. 4 is a depiction of a residual network.
Figure 6A:
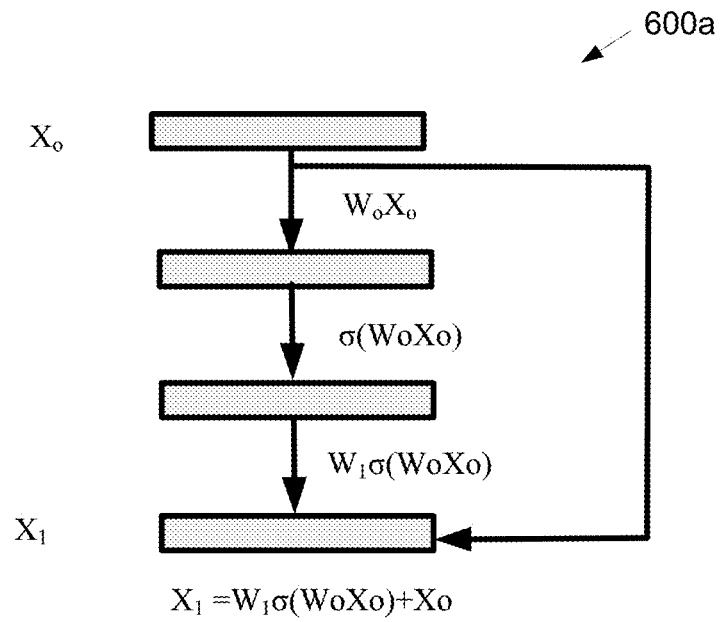
FIGS. 6A and 6B (collectively referred to as FIG. 6) show an element of a residual network (FIG. 6A) and the functional Mirror DNN equivalent (FIG. 6B).
Figure 6B:
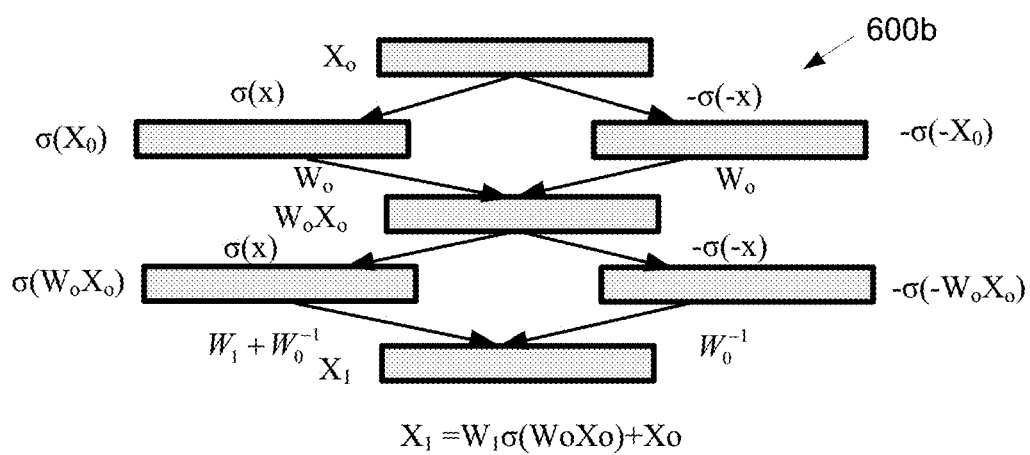

It is even possible to use a Mirror DNN to emulate the residual network illustrated in FIG. 4. The proof is provided in FIG. 6A and FIG. 6B. FIG. 6A represent the intermediate layer of a residual DNN which computes $X_1 = W_1 \sigma(W_0 X_0) + X_0$. FIG. 6B computes the same function using two Mirror intermediate layers. The first intermediate layer compute $W_0 X_0$ and is linear. The second layer computes:

$$X_1 = W_1 \sigma(W_0 X_0) + W_0^{-1} W_0 X_0 = W_1 \sigma(W_0 X_0) + X_0$$

which is the function computed by the residual intermediate layer.

Note that the residual network architecture can drastically change the nature of optimization, and it is indeed a common practice. But the residual network starts from the assumption that the function of interest deviates from the identity. The identity is not an interesting function.

A more interesting hypothesis is that the function of interest should deviate from a linear function. Linear functions are very easy to learn and far more plausible and useful than the identity. So we start from the following regularizer:

$$r\sum_i \|W_i - V_i\|^2$$

at every layer. If $r \neq 0$, this deep network will regularize to a linear network. This regularizer is called a "linear regularizer". Linear regularization is equivalent to the prior that the desired function is close to a linear function. This is far more plausible than L2 regularization ($r\|W_i\|^2$), which is equivalent to the prior to that the desired function is close to a constant function with all output units equal to 0.5 for all patterns.

Analyzing the dynamic of the almost linear Mirror DNNs when both $W_i$ and $V_i$ are optimized simultaneously, one starts from:

$$X_i = (W_{i-1} - V_{i-1})\sigma(X_{i-1}) + V_i X_{i-1} = (W_{i-1} - V_{i-1})\sigma(-X_{i-1}) + W_{i-1}X_{i-1}$$

The gradient of the output of a layer with respect to its input is:

$$\frac{\partial X_i}{\partial X_{i-1}} = (W_{i-1} - V_{i-1})\sigma'(X_{i-1}) + V_i$$

And the gradient of the objective function with respect to the weights at layer i is:

$$\frac{\partial E_p(W)}{\partial W_i} = \frac{\partial E(W)}{\partial X_n}\left(\prod_{k=n}^{k=i+2} \frac{\partial X_k}{\partial X_{k-1}}\right)\frac{\partial X_{i+1}}{\partial W_i} + r(W_i - V_i) =$$

$$(X_n - L)\left(\prod_{k=n}^{k=i+2}(W_{i-1} - V_{i-1})\sigma'(X_{i-1}) + V_i\right)X_i + r(W_i - V_i)$$

It should be noted that if the $W_i=V_i$, the system simplifies to:

$$X_i = W_{i-1}X_{i-1} = \left(\prod_{k=i-1}^{k=0} W_i\right)X_0$$

$$\frac{\partial E_p(W)}{\partial W_i} = (X_n^p - L^p)\left(\prod_{k=n-1, k\neq i}^{k=0} W_k\right)X_0^p$$

$$\frac{\partial^2 E_p(W)}{\partial W_i \partial W_j} = (X_n^p - L^p)\left(\prod_{k=n-1, k\neq i, k\neq j}^{k=0} W_k\right)X_0^p$$

And $$\frac{\partial^2 E(W)}{\partial W_i \partial W_j} = \sum_p (X_n^p - L^p)\left(\prod_{k=n-1, k\neq i, k\neq j}^{k=0} W_k\right)X_0^p$$

It should be noted that this a well-conditioned Hessian if all the $W_i$ are close to being isometries with a common scaling factor. This is not surprising because linear networks are easy to optimize and successive linear networks are under constrained. This under constraining can cause problems because one could have a linear layer with large weights followed by a linear layer with small weights. A gradient update on the layer with small weights could result in a large variation and divergence. To address this, one can use additional constraints to ensure that the gradients from layer to layer. "Batch normalization" is a common way to achieve this result. Initialization may be sufficient.

The learning dynamic of a Mirror DNN can proceed as follows. The network is initialized with Vi=Wi and small weights. The network quickly converges toward the best linear approximation to the desired function because the linear dynamic converges quickly and the initial conditions and the linear regularizer keeps the network in the linear regime as much as possible. The network then evolves in the non-linear mode and the convergence becomes more complex. This happens only when the data overwhelms the linear regularizer. The price of non-linear optimization is paid only when the data requires it.

1.4.2 Initialization of Mirror DNNs.

It is possible to initialize a Mirror DNN to a pre-existing trained standard DNN by copying the corresponding $W_i$ at each layer and setting $V_i=0$. The Mirror DNN then starts with the performance of a standard DNN since they compute the same function. Learning is started with the linear regularizer. If the linear regularizer is small, the pull toward a linear function will not have a negative effect on the performance. However, it will bring the learning dynamic closer to a linear dynamic, which is far easier to optimize. Network performance can improve as a result of superior optimization.

It is also possible to initialize a Mirror DNN to a pre-existing trained residual DNN. How this can be done is explained in section 1.4.4. Starting from this initialization, the Mirror DNN starts with the performance of the residual DNN since they compute the same function. Learning is started with the linear regularizer. If the linear regularizer is small, the pull toward a linear function will not have a negative effect on the performance. However, it will bring the learning dynamic closer to a linear dynamic, which is far easier to optimize. Network performance can improve as a result of superior optimization.

Mirror DNNs can also be initialized from scratch. In the absence of mechanisms to normalize the gradients, they are sensitive to initialization. If the weights at each layer are too small, the gradient will vanish through the layers. If the weights are too large, the gradient will explode. The desired property is that the variance of the gradient be preserved from layer to layer. In other words:

$$\text{var}(\text{grad}_{i+1}) \approx \text{var}(\text{grad}_i)$$

This is not very hard to impose as an initial condition. For instance, assume that all the weights $w_i$ and $v_i$ are chosen randomly to have a mean of 0 and a standard deviation of s. Assuming $x_i$, $w_i$ and $v_i$ are all independent variables and $f$ is equivalent to a coin flip $cx_i$ where c is 1 or 0 with equal probability (because $x_i$ is equally likely to be positive or negative), one can write:

$$\text{var}(f(x_i)) = \text{var}(c) * \text{var}(x_i) = \frac{1}{4}\text{var}(x_i)$$

If N is the number of unit per layer and each unit receives N inputs from the previous layer, then:

$$\text{var}(x_1) = N\text{var}(w) * \frac{1}{4}\text{var}(x_0) + N\text{var}(v) * \frac{1}{4}\text{var}(x_0)$$

If var(w)=var(v) and var($x_1$)=var($x_0$) then:

$$\text{var}(x_1) = \text{var}(w)\left(\frac{N}{4} + \frac{N}{4}\right)\text{var}(x_0)$$

$$\text{var}(w) = \frac{1}{2N}$$

In other words, if all the weights $w_i$ are initialized with random numbers with an average of 0 and a standard deviation of $$\sqrt{\frac{1}{2N}},$$

and $v_i=-w_i$ then the variance will be conserved going forward. Since the Jacobian going backward is the Jacobian going forward, then:

$$\text{var}(x_1) \approx \text{var}(x_0) \Leftrightarrow \text{var}(\text{grad}_{i+1}) \approx \text{var}(\text{grad}_i)$$

1.4.3 Decomposition of a Linear Function into a Sum of Non-Linear Functions

The ability to decompose a linear function into a linear combination of non-linear function is useful because it allows the same trainable linear parameters to compute both linear and non-linear functions. The simplest example is the ReLu function, $\sigma(x)=\max(0, x)$. It is a non-linear function and the following linear combination of ReLUs is linear and equal to the identity: $\sigma(x)-\sigma(-x)=x$. A linear combination of two non-linear functions $\sigma(x)$ and $-\sigma(-x)$ can be used to compute a linear function using the formula: $A\sigma(x)+B(-\sigma(-x))$. It is easy to see that A controls the slope when x is positive and B controls the slope when x is negative. When A=B, the function becomes linear with the slope A. Other functions exhibit the same properties. For instance, the function $$\sigma_a(x) = \frac{1}{a}\log(1 + e^{ax})$$

verifies $\sigma_a(x) - \sigma_a(-x) = x$ and can be used as a linear combination of non-linear functions which can become linear $(A\sigma_a(x) + B(-\sigma_a(-x)) = Ax_{if}A=B)$. Non-symmetric combinations are also possible. However, it is easier to optimize uncorrelated parameter than it is to optimize correlated parameters (e.g. A and B, as opposed to A–B and B). For instance, if if max(0, x) and x are used as base functions, it is likely that the coefficient that multiplies will be much larger than the coefficient that multiplies max(0, x), since most problems are linear over large portion of the input and feature space. This leads to poor conditioning of the Hessian. The mirror configuration is better conditioned since the parameters and has the same amplitude when the function is linear.

Figure 5:
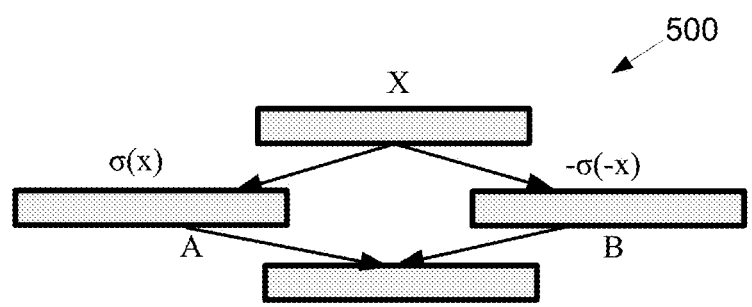
FIG. 5 depicts a layer as a linear combination of two non-linear functions. If A=B, this layer computes a linear function. For $\sigma_1(x)=\sigma(x)$, $\sigma_2(x)=-\sigma(-x)$, $A=W_i$, and $B=V_i$.

1.4.4 Using Non-Linear Function in NN layers:

A typical layer 500 in a Mirror DNN is illustrated as shown in FIG. 5. An interesting question is whether the function computed by an element of a residual DNN can be computed by a Mirror DNN. As discussed previously in Section 1.4.1, the residual DNN 400 is illustrated in FIG. 4. The function computed by a residual DNN element 600*a* is $X_1 = W_1 \sigma(W_0 X_0) + X_0$ as shown in FIG. 6A. This function can be computed by a Mirror DNN 600*b*, as shown in FIG. 6B, with the same number of weight layers in two steps:

$$X'_0 = W_0 \sigma(X_0) - W_0 \sigma(-X_0) = W_0 X_0$$

$$X_1 = (W_1 + W_0^{-1})\sigma(X'_0) - W_0^{-1}\sigma(-X'_0) = W_1 \sigma(W_0 X_0) + X_0$$

1.4.5 Decomposition of a Linear Function into Non-Linear Functions

Figure 7A:
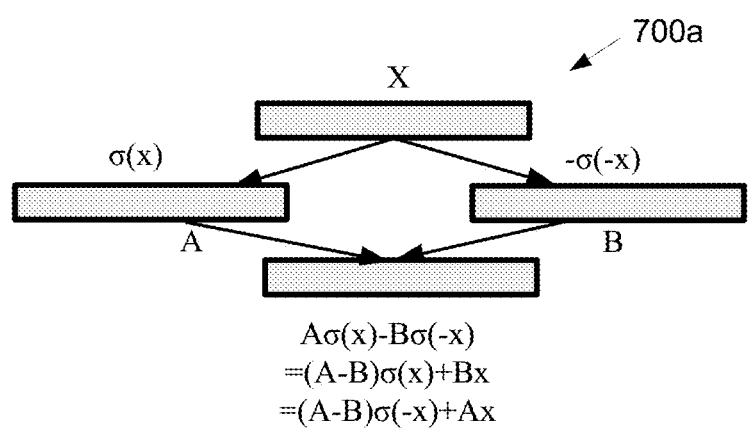
FIGS. 7A and 7B (collectively referred to as FIG. 7) show a linear combination of non-linear functions (FIG. 7A) and a non-linear combination of linear decomposition (FIG. 7B).

It was discussed previously that a linear function can be decomposed as a linear composition of non-linear functions using the formula: $A\sigma(x) + B(-\sigma(-x))$. It is possible to reverse the order of the non-linear and linear operations as suggested in FIGS. 7A and 7B. If x is a scalar, the two approaches are equivalent for $\sigma(x) = \max(0, x)$. The reason is that if $A \geq 0$, then $\sigma(Ax) = \sigma(x)$ and $\sigma(Ax) = -A\sigma(-x)$ if $A \leq 0$. One can then decompose the function into a linear and a non-linear component as shown in FIG. 7A. This is not possible if the function is more complex (e.g. $\sigma_a(x) = 1/a \log(1 + e^{ax})$) or in higher dimension. For instance, in dimension 2, the function becomes:

$$\sigma(a_{00}x_0 + a_{01}x_1) - \sigma(b_{00}x_0 + b_{01}x_1)$$

$$\sigma(a_{10}x_0 + a_{11}x_1) - \sigma(b_{10}x_0 + b_{11}x_1)$$

One cannot move the coefficients $a_{ij}$ or $b_{ij}$ out of the $\sigma$ functions regardless of what it is known that the argument of $\sigma$ depends on both $x_0$ and $x_1$. One can optimize such a layer and regularize it to a linear function by minimizing $(A-B)^2$. Both the architectures 700*a* in FIG. 7A and 700*b* in FIG. 7B can be regularized toward a linear function.

1.4.6 Computation of Linear Functions at Intermediate Layers

The intermediate layer computes an output (of the intermediate layer) that is a function of the input (to that intermediate layer) and the weights (of that intermediate layer). In other words, looking at FIG. 3A, 3B, 3C, the intermediate layer function $F_i$ can be defined as:

$$X_i = F_i(X_i, W_i, V_i)$$

The formal definition of linearity of $F_i$ with respect to its input (first argument) is:

$$\forall (X, Y) \in \mathbb{R}^n \times \mathbb{R}^n, F_i(X+Y, W_i, V_i) = F_i(X, W_i, V_i) + F_i(Y, W_i, V_i)$$

$$\forall (X, \alpha) \in \mathbb{R}^n, F_i(\alpha X, W_i, V_i) = \alpha F_i(X, W_i, V_i)$$

Figure 7B:
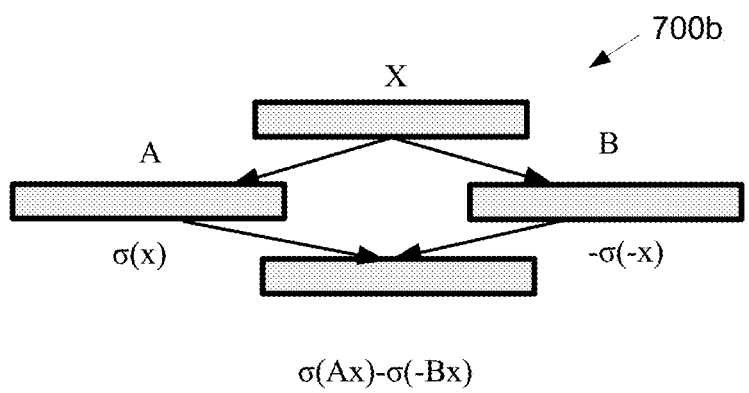

Looking at FIGS. 7A and 7B, which are a symbolic representation of FIGS. 3B and 3C:

In FIG. 7A, $$X_{i+1} = F_i(X_i, W_i, V_i) = (W_i - V_i)\sigma(-X_i) + W_i X_i$$

If $W_i = V_i$, then $F_i(X_i, W_i, V_i) = W_i X_i$. Since matrix multiplication is linear, it is easy to show that $F_i(X+Y, W_i, V_i) = W_i(X+Y) = W_i X + W_i Y = F_i(X, W_i, V_i) + F_i(Y, W_i, V_i)$ $$F_i(\alpha X, W_i, V_i) = W_i(\alpha X) = \alpha W_i X = \alpha F_i(X, W_i, V_i)$$

For FIG. 7B, $$X_{i+1} = F_i(X_i, W_i, V_i) = \sigma(W_i X_i) - \sigma(V X_i)$$

If $W_i = V_i$, then $F_i(X, W_i, V_i) = \sigma(W_i X_i) - \sigma(-W_i X_i) = W_i X_i$ since this is the property we chose for $\sigma$. This is the same function as FIG. 7A (when $W_i = V_i$) so it is linear too. The point is that for each intermediate layer there exists matrix values $W_i$ and $V_i$ such that the intermediate layer function is linear in its input (for all input values).

In Mirror DNN implementations, a first non-linear equation $\sigma_1$ and a second non-linear equation $\sigma_2$ (for instance $\sigma_2(x) = -\sigma_1(-x)$) are chosen so as to make the function $F_i(X_i, W_i, V_i)$ computed by an intermediate layer linear with respect to the input of the intermediate layer for some values of the weight matrices. The functions $\sigma_1$ and $\sigma_2$ are fixed before training. During training, the training parameters $W_i$ and $V_i$ are updated using gradient descent to minimize some objective function which accounts for both the overall classification function to be accurate and a regularizer. The regularizer keeps the function at each intermediate layer as linear as possible. The reason is that the regularizer is a term of the objective function (typically $r\Sigma_i \|W_i - V_i\|^2$) and gradient descent will minimize $\|W_i - V_i\|$ as much as possible until it conflicts with the data. When $\|W_i - V_i\|$ approaches 0, we have $W_i \approx V_i$ and the intermediate layer is almost linear. From an optimization point of view, it is as good as linear, and optimization is much easier. The regularizer parameter is chosen to be small enough for the data to override the regularizer when they are in conflict. This strategy ensures that the cost of optimizing a non-linear function is only paid in small regions of the space where the data requires it.

1.5 Exemplary Processes for Using Mirror DNNs

Figure 8B:
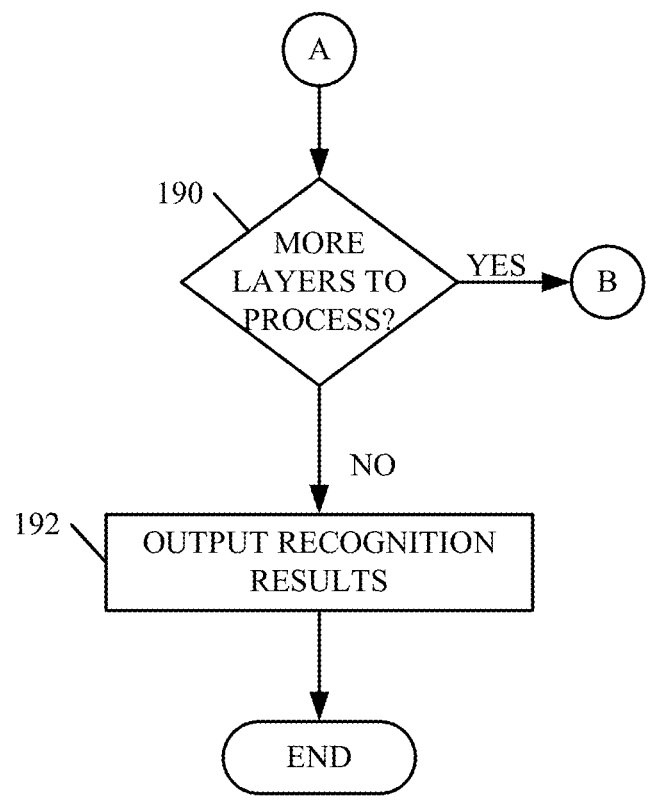

FIGS. 8A and 8B (collectively referred to herein as FIG. 8) illustrate a flow diagram showing one implementation 800 of the operation of architecture 100 in applying a feature vector 120 to a Mirror DNN 122 to obtain a recognition result. A user interface mechanism 104 first receives a physical input for recognition. This is indicated by block 150. As mentioned previously, the input can be a speech input 152, a handwriting input 154, an image 156, or a wide variety of other inputs 158.

User interface mechanism 104 then generates a signal indicative of the input, as indicated by block 160. Feature extractor 112 then extracts a feature set from the signal, as indicated by block 162. The feature set can be in the form of a feature vector 164. It can include, for instance, acoustic features 166, handwriting features 168, visual image features 170, or a wide variety of other features 172.

The feature set is then applied as an input to the input level of Mirror DNN 122, as indicated by block 174. Selection and processing of the next layer begins, as shown in block 176. The values input into the presently processed (intermediate) layer are duplicated to create a first group of values and a second group of values, as shown in block 178. As shown in block 180, a first non-linear equation is applied to the first group of values to create a first group of modified values. A second non-linear equation is applied to the second group of values to create a second group of modified values, as shown in block 182. The first non-linear equation and the second non-linear equation have been chosen before training the Mirror DNN to make the output of the (intermediate) layer of the Mirror DNN linear for some values of the matrices of the (intermediate layer). The first group of modified values is received by a mirror layer and multiplied by weight values in a first matrix to produce a third group of modified values, as shown in block 184. The second group of modified values is also received by the mirror layer and multiplied by a second matrix of weight values to produce a fourth group of modified values, as also shown in block 184. As shown in block 186, the third and fourth group of modified values are added to produce the output of the (intermediate) layer.

Next, if there are more layers in the Mirror DNN to be processed, then the output of the current level is provided as the input to the next level. This is indicated by block 190. The output of the last layer has output values that are indicative of a recognized pattern exhibited in the input signal. When processing is completed, recognition results 126 are output by the Mirror DNN 122. This is indicated by block 192.

Figure 9A:
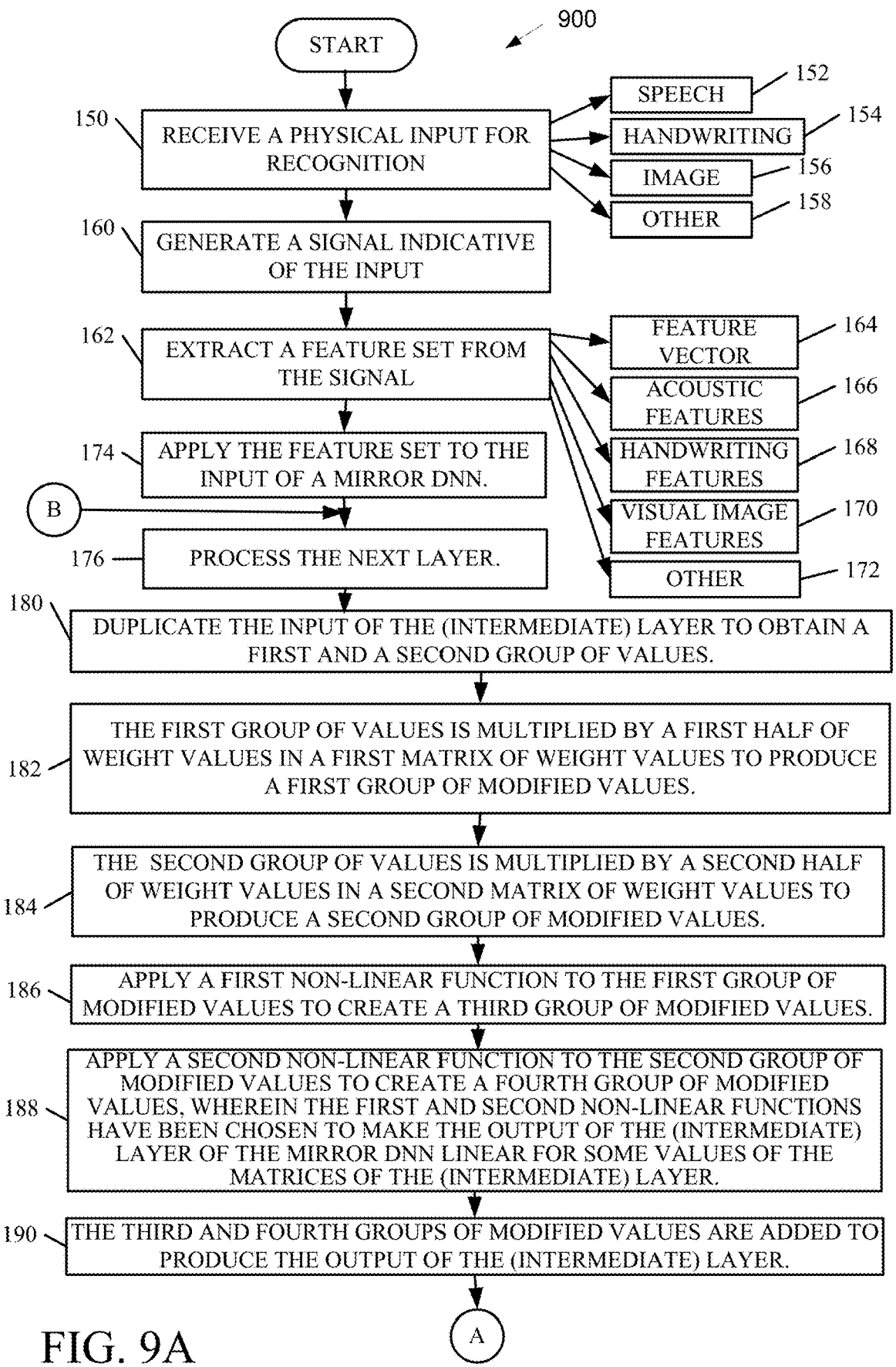
FIGS. 9A and 9B (collectively referred to as FIG. 9) show a flow diagram illustrating another example of the operation of the architecture shown in FIG. 1 in performing pattern recognition using a Mirror DNN.
Figure 9B:
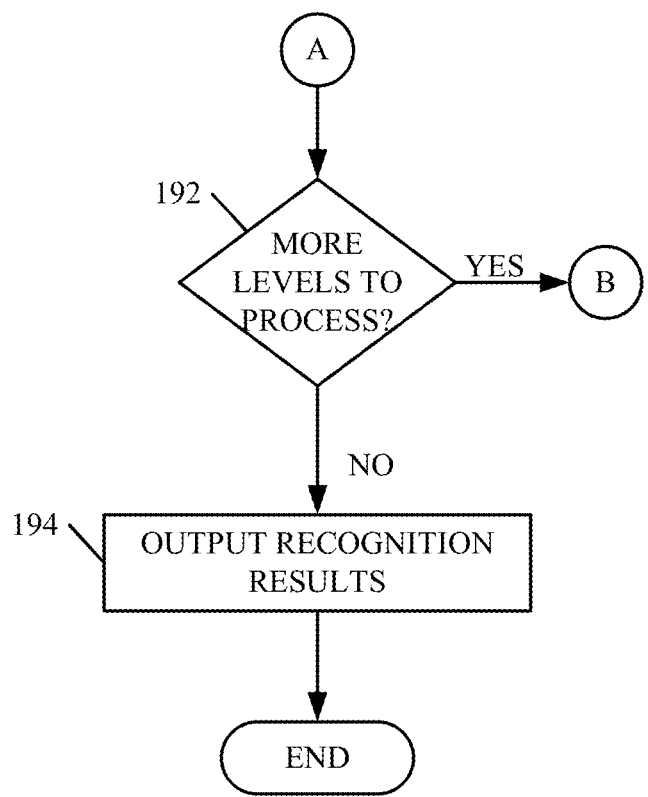

FIGS. 9A and 9B (collectively referred to herein as FIG. 9) illustrate a flow diagram showing another implementation 900 of the operation of architecture 100 in applying a feature vector 120 to a Mirror DNN 122 to obtain a recognition result. A user interface mechanism 104 first receives a physical input for recognition. This is indicated by block 150. As mentioned previously, the input can be a speech input 152, a handwriting input 154, an image 156, or a wide variety of other inputs 158.

User interface mechanism 104 then generates a signal indicative of the input, as indicated by block 160. Feature extractor 112 then extracts a feature set from the signal, as indicated by block 162. The feature set can be in the form of a feature vector 164. It can include, for instance, acoustic features 166, handwriting features 168, visual image features 170, or a wide variety of other features 172.

The feature set is then applied an input to the input level of Mirror DNN 122, as indicated by block 174. The next layer to be processed is chosen, as shown in block 176. The input from an immediately preceding layer of the neural network is duplicated to create a first group of values and a second group of values, as shown in block 180. As shown in block 182, the first group values is multiplied by a first half of weight values in a first matrix of weight values to produce a first group of modified values. The second group of values is multiplied by a second half of weight values in a second matrix of weight values to produce a second group of modified values, as shown in block 184. A first non-linear function is applied to the first group of modified values to create a third group of modified values, as shown in block 186. A second non-linear function is applied to the second group of modified values to create a fourth group of modified values, wherein the first and second non-linear functions have been chosen to make the output of the (intermediate) layer of the Mirror DNN linear for some values of the (intermediate) layer, as shown in block 188. The third and fourth group of modified values are added to produce the output of the (intermediate) layer, as shown in block 190.

Next, if there are more levels in the Mirror DNN to be processed, then the output of the current level is provided as the input to the next level. This is indicated by block 192. The output of the last layer has output values that are indicative of a recognized pattern exhibited in the input signal. When processing is completed, recognition results 126 are output by the Mirror DNN 122. This is indicated by block 194.

Figure 10:
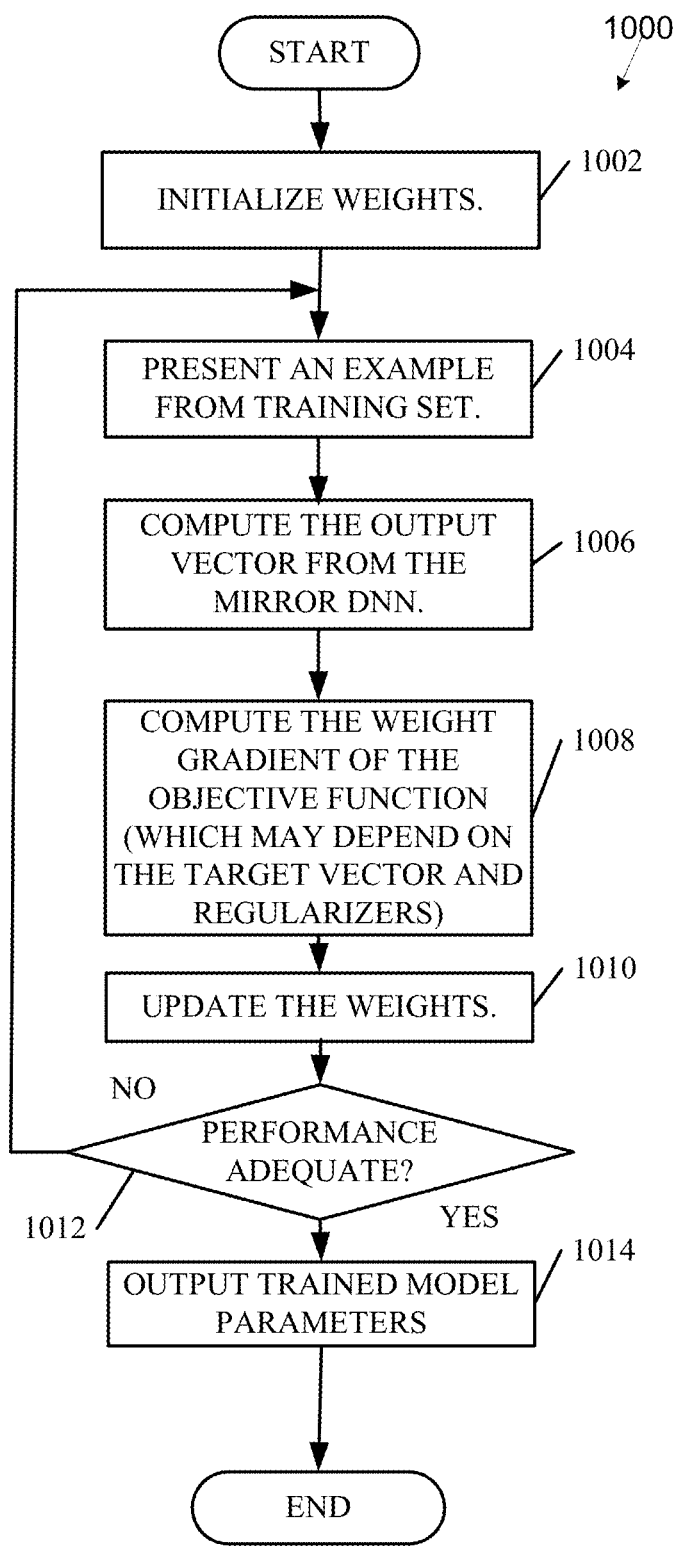
FIG. 10 is a flow diagram illustrating one example of the operation of a training system, in training a mirror deep neural network.

FIG. 10 is a flow diagram illustrating one exemplary process 1000 of training a Mirror DNN model 122. First, weights are initialized, as shown in block 1002. An example from a set of training features is applied to the Mirror DNN. This is indicated by block 1104. That training feature is applied to the input of the Mirror DNN and the output (vector) from the Mirror DNN is computed. This is indicated by block 1106. The weight of the gradient of an objective function (which may depend on a target vector and regularizers) is computed, as shown in block 1008. The weights are then updated, as shown in block 1010. It is then determined whether there is any more training needed, or whether the Mirror DNN is sufficiently trained (e.g. whether its performance is adequate). This is indicated by block 1012. If additional training is needed, then the processing reverts to block 1104. However, if no further training is needed, then the trained model parameters are output for use in a runtime system. This is indicated by block 1014. In some implementations a regularizer is applied during training to affect the first and second matrix of weights so as to make some values of the intermediate layer closer to a linear function of its input. The training procedure illustrated in FIG. 10 is sometimes referred to as stochastic gradient descent. Other gradient descent based training procedures can be used advantageously. The benefit of the Mirror DNN architecture is to provide well-conditioned gradients.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

1.6 Exemplary Mirror DNN Architecture in a Cloud Computing Environment

Figure 11:
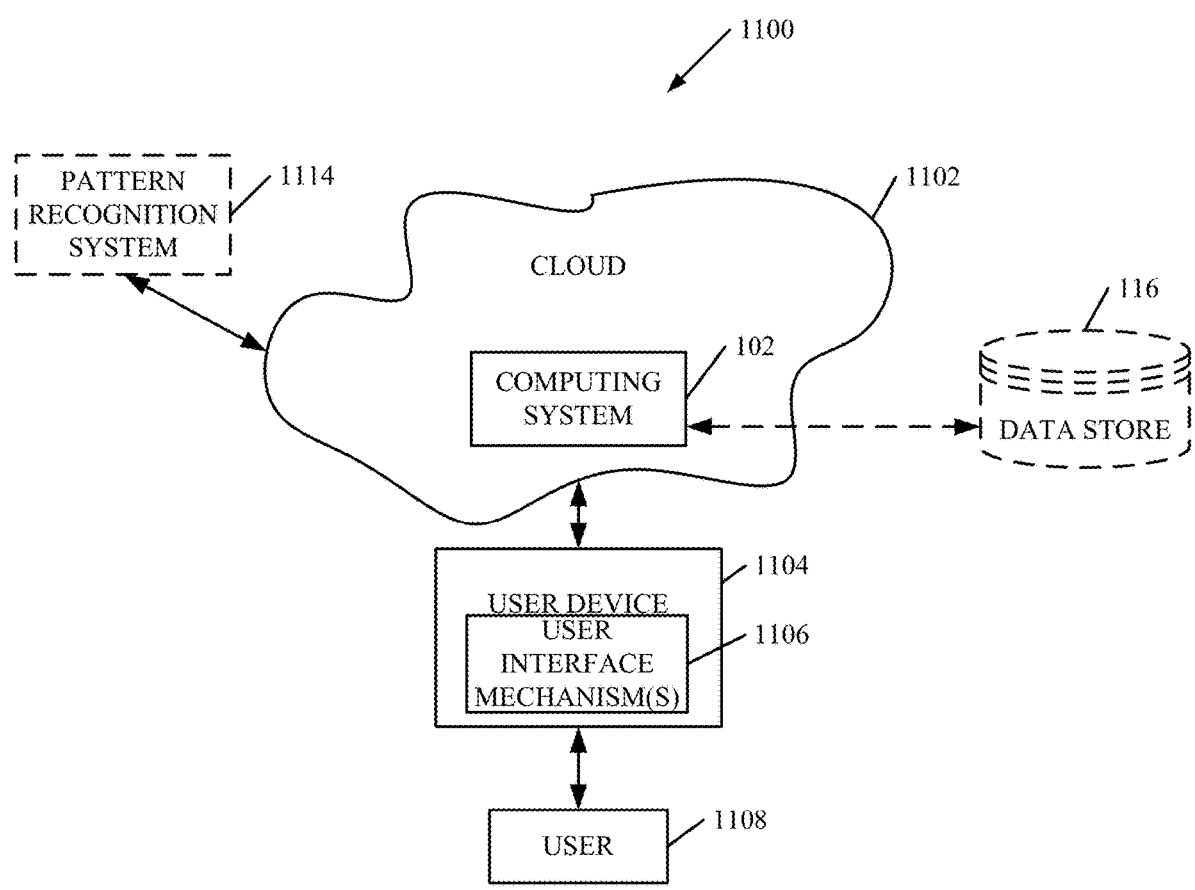
FIG. 11 is a block diagram of one example of the architecture shown in FIG. 1, deployed in a cloud computing architecture.

FIG. 11 is a block diagram of architecture 100, shown in FIG. 1, except that its elements are disposed in a cloud computing architecture 1100. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 11, some items are similar to those shown in FIG. 1 and they are similarly numbered. FIG. 11 specifically shows that computing system 102 is located in cloud 1102 (which can be public, private, or a combination where portions are public while others are private). Therefore, user 1206 uses a user device 1104 to access those systems through cloud 1102.

FIG. 11 also depicts another example of a cloud architecture. FIG. 11 shows that it is also contemplated that some elements of computing system 102 are disposed in cloud 1102 while others are not. By way of example, data store 116 can be disposed outside of cloud 1102, and accessed through cloud 1102. In another example, pattern recognition system 114 is also outside of cloud 1102. Regardless of where they are located, they can be accessed directly by device 1104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

2.0 Computing Environment

Figure 12:
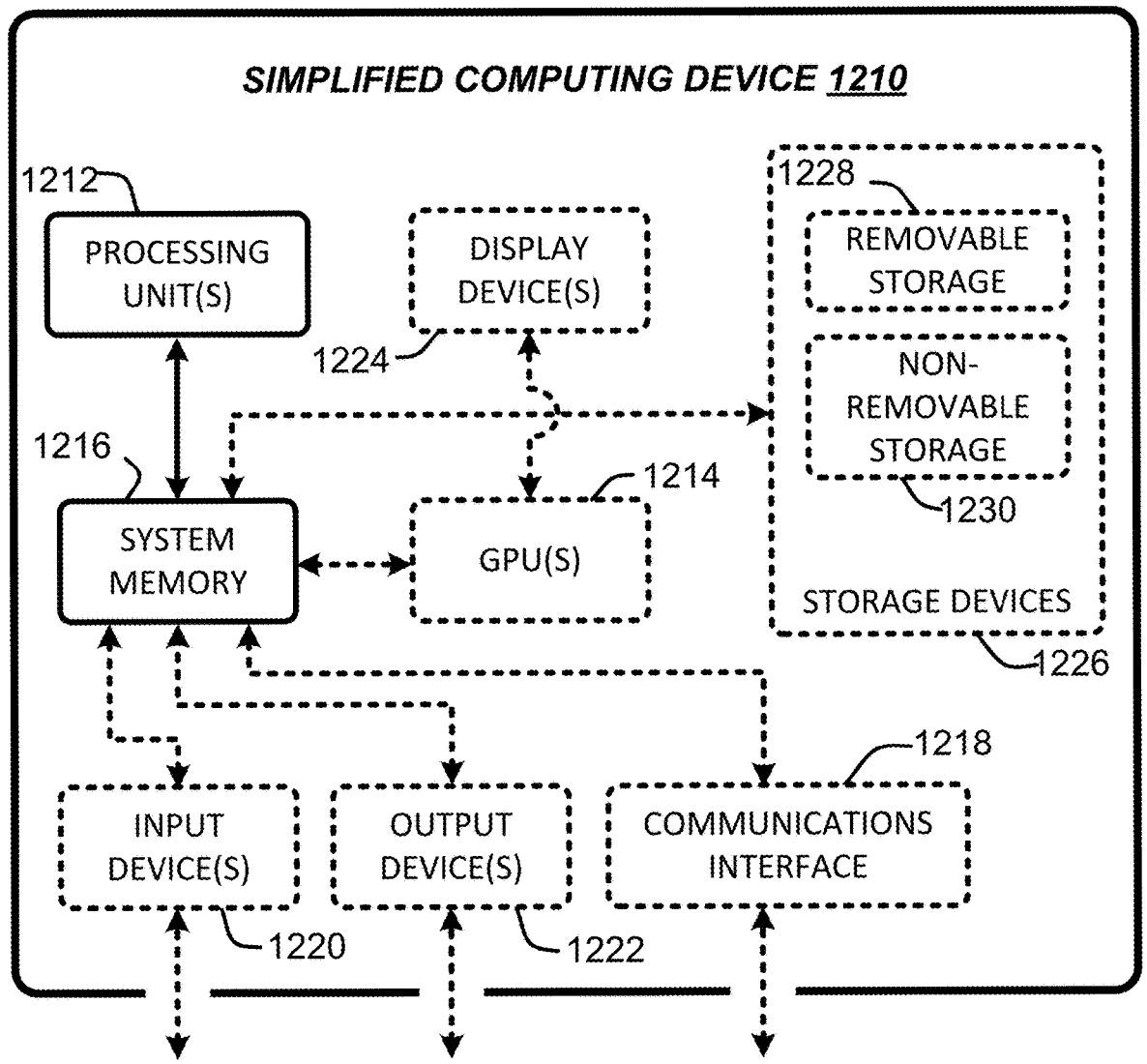
FIG. 12 is a block diagram of one example of a computing environment that can be used in the architectures shown in the previous figures.

Referring now to FIG. 12, the systems and methodologies disclosed herein for generating and using a Mirror DNN are operational within numerous types of general purpose or special purpose computing system environments or configurations. FIG. 12 illustrates a simplified example of a general-purpose computer system on which various implementations and elements for generating a Mirror DNN, as described herein, may be implemented. It is noted that any boxes that are represented by broken or dashed lines in the simplified computing device 1210 shown in FIG. 12 represent alternate implementations of the simplified computing device. As described below, any or all of these alternate implementations may be used in combination with other alternate implementations that are described throughout this document. The simplified computing device 1210 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Mirror DNN implementations described herein, the device should have a sufficient computational capability and system memory to enable basic computational operations. In particular, the computational capability of the simplified computing device 1210 shown in FIG. 12 is generally illustrated by one or more processing unit(s) 1212, and may also include one or more graphics processing units (GPUs) 1214, either or both in communication with system memory 1216. Note that that the processing unit(s) 1212 of the simplified computing device 1210 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 1210 may also include other components, such as, for example, a communications interface 1218. The simplified computing device 1210 may also include one or more conventional computer input devices 1220 (e.g., touchscreens, touch-sensitive surfaces, pointing devices, keyboards, audio input devices, voice or speech-based input and control2devices, video input devices, haptic input devices, devices for receiving wired or wireless data transmissions, and the like) or any combination of such devices.

Similarly, various interactions with the simplified computing device 1310 and with any other component or features of the Mirror DNN implementations described herein, including input, output, control, feedback, and response to one or more users or other devices or systems associated with the Mirror DNN implementations, are enabled by a variety of Natural User Interface (NUI) scenarios. The NUI techniques and scenarios enabled by the Mirror DNN implementations include, but are not limited to, interface technologies that allow one or more users user to interact with the Mirror DNN implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Mirror DNN implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Mirror DNN implementations described herein.

The simplified computing device 1210 may also include other optional components such as one or more conventional computer output devices 1222 (e.g., display device(s) 1224, audio output devices, video output devices, devices for transmitting wired or wireless data transmissions, and the like). Note that typical communications interfaces 1218, input devices 1220, output devices 1222, and storage devices 1226 for general-purpose computers are well known to those skilled in the art, and will not be described in detail herein.

The simplified computing device 1210 shown in FIG. 12 may also include a variety of computer-readable media. Computer-readable media can be any available media that can be accessed by the computer 1210 via storage devices 1226, and can include both volatile and nonvolatile media that is either removable 1228 and/or non-removable 1230, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various Mirror DNN implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The Mirror DNN implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The Mirror DNN implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

While Mirror DNNs have been described by specific reference to implementations thereof, it is understood that variations and modifications thereof can be made without departing from its true spirit and scope. It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A neural network pattern recognizer system for recognizing patterns in an input signal, comprising:
one or more processors; and
one or more memory devices having instructions stored thereon executable by the one or more processors to:
receive a set of features extracted from an input signal that is representative of a physical input; and
input the set of features into a multi-layer neural network comprising an input layer that receives the set of features, a plurality of intermediate layers, and an output layer that generates a set of output values which are indicative of a recognized pattern exhibited in the input signal that are used in an application;
wherein one or more of the plurality of intermediate layers comprises:
input connections from nodes of an immediately preceding layer of the neural network which operate on values received from the immediately preceding layer and then duplicate the values to create a first group of values and a second group of values, wherein the first group of values are operated on using a first non-linear equation to create a modified first group of values and the second group of values are operated on using a second non-linear equation to create a modified second group of values, and a mirror layer comprising a first group of nodes which receive the modified first group of values each of which is multiplied by a first half of weight values in a first matrix of weight values, and further comprising a second group of nodes which receive the modified second group of values each of which is multiplied by a second half of weight values in a second matrix of weight values, wherein the output layer comprises nodes each of which receives and sums the values output by the first and second groups of nodes of the mirror layer, and wherein the first non-linear equation and the second non-linear equation are chosen so as to direct an output of the intermediate layer toward linearity with respect to an input of the intermediate layer for some values of the first and second weight matrices.

2. The system of claim 1, wherein the first or the second matrix of at least one intermediate layer is initialized to values that make a function computed by the intermediate layer linear.

3. The system of claim 1, wherein the first or the second matrix is initialized with random values.

4. The system of claim 1, wherein the second matrix of weight values is a mirror of the first matrix of weight values.

5. The system of claim 1, wherein the first matrix of weight values is initialized using weights obtained after training a ReLU neural network using a same training set that is used to train said neural network pattern recognizer, and wherein the second matrix of weight values is initialized with zeros.

6. The system of claim 1, wherein the plurality of intermediate layers is initialized to compute a same function as a residual neural network.

7. The system of claim 1 wherein the input signal comprises a speech signal indicative of a speech input and wherein the set of features extracted comprise an acoustic feature vector of acoustic features from the speech signal.

8. The system of claim 1 wherein the input signal comprises an image signal indicative of an image input representing a captured image and wherein the set of features comprise an image feature vector of image features from the image signal.

9. The system of claim 1 wherein the input signal comprises a handwriting recognition signal indicative of a handwriting input and wherein the set of features comprise a handwriting feature vector of character recognition features from the handwriting recognition signal.

10. The system of claim 1, further comprising iteratively inputting the set of features into the multi-layer neural network and adjusting first matrix and second matrix of weight values of each intermediate layer with gradient descent until the set of output values are sufficiently close to expected output values.

11. The system of claim 10, further comprising a regularizer that is applied during training to affect the first matrix and the second matrix of weights so as to make the output of the intermediate layer closer to a linear function of its input.

12. A neural network pattern recognizer system for recognizing patterns in an input signal, comprising:
one or more processors; and
one or more memory devices having instructions stored thereon executable by the one or more processors to:
receive a set of features extracted from an input signal that is representative of a physical input; and
input the set of features into a multi-layer neural network comprising an input layer that receives the set of features, a plurality of intermediate layers, and an output layer that generates a set of output values which are indicative of a recognized pattern exhibited in the input signal that are used in an application,
wherein one or more of the plurality of intermediate layers comprises:
input connections from nodes of an immediately preceding layer of the neural network which operate on values received from the immediately preceding layer and then duplicate the values to create a first group of values and a second group of values,
a mirror layer comprising a first group of nodes which receive the first group of values each of which is multiplied by a first half of weight values in a first matrix of weight values, and further comprising a second group of nodes which receive the second group of values each of which is multiplied by a second half of weight values in a second matrix of weight values, and
a non-linear layer, wherein the first group of nodes are operated on using a first non-linear equation to create a third group of nodes and the second group of nodes are operated on using a second non-linear equation to create a fourth group of nodes,
wherein the output layer comprises nodes each of which receives and sums the values output by the third and fourth group of nodes, and
wherein the first non-linear equation and the second non-linear equation are chosen so as to direct an output of the intermediate layer toward linearity with respect to an input of the intermediate layer for some values of the weight matrices.

13. The system of claim 12, wherein the first or the second matrix of at least one intermediate layer is initialized to values that make a function computed by the intermediate layer linear.

14. The system of claim 12, wherein the first or the second matrix is initialized with random values.

15. The system of claim 12, wherein the second matrix of weight values is a mirror of the first matrix of weight values.

16. The system of claim 12 wherein the input signal comprises a speech signal indicative of a speech input and wherein the set of features extracted comprise an acoustic feature vector of acoustic features from the speech signal.

17. The system of claim 12, wherein the input signal comprises an image signal indicative of an image input representing a captured image and wherein the set of features comprise an image feature vector of image features from the image signal.

18. The system of claim 12, further comprising iteratively inputting the set of features into the multi-layer neural network and adjusting first matrix and second matrix of weight values of each intermediate layer with gradient descent until the set of output values are sufficiently close to expected output values.

19. The system of claim 16, further comprising a regularizer that is applied during training to affect the first matrix and the second matrix of weights so as to make the output of the intermediate layer closer to a linear function of its input.

20. A computer-implemented process for recognizing patterns in an input signal, comprising using a computer to perform the following actions:
    extracting a set of features from an input signal that is representative of a physical input;
    inputting the set of features into a multi-layer neural network comprising an input layer that receives the set of features, a plurality of intermediate layers, and an output layer that generates of set of output values which are indicative of a recognized pattern exhibited in the input signal;
    wherein one or more of the intermediate layers comprises;
        input connections from nodes of an immediately preceding layer of the neural network which operate on values received from the immediately preceding layer and then duplicate the values to create a first group of values and a second group of values, wherein the first group of values are operated on using a first non-linear equation to create a first group of modified values and the second group of values are operated on using a second non-linear equation to create a second group of modified values, and
        a mirror layer comprising a first group of nodes which receive the modified first group of values each of which is multiplied by a first half of weight values in a first matrix of weight values to produce a third group of modified values, and further comprising a second group of nodes which receive the modified second group of values each of which is multiplied by a second half of weight values in a second matrix of weight values to produce a fourth group of modified values,
    wherein the output layer comprises nodes each of which receives and sums the third and fourth group of modified values, and
    wherein the first non-linear equation and the second non-linear equation are chosen so as to direct an output of the intermediate layer toward linearity with respect to an input of the intermediate layer for some values of the first and second weight matrices; and
    outputting values computed at the output layer that are indicative of a recognized pattern in the input signal for use with an application.

* * * * *